United States Patent
Keith, Jr.

(10) Patent No.: US 7,305,399 B2
(45) Date of Patent: *Dec. 4, 2007

(54) METHOD AND APPARATUS FOR APPLYING A PARAMETRIC SEARCH METHODOLOGY TO A DIRECTORY TREE DATABASE FORMAT

(75) Inventor: Robert Olan Keith, Jr., Modesto, CA (US)

(73) Assignee: The Web Access, Inc., San Jose, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 09/800,607

(22) Filed: Mar. 6, 2001

(65) Prior Publication Data

US 2001/0025304 A1    Sep. 27, 2001

Related U.S. Application Data

(60) Provisional application No. 60/200,963, filed on May 1, 2000, provisional application No. 60/188,328, filed on Mar. 9, 2000.

(51) Int. Cl.
*G06F 17/30* (2006.01)
(52) U.S. Cl. ............................... 707/101; 707/1; 707/3
(58) Field of Classification Search ................. 707/1–6, 707/100–102
See application file for complete search history.

(56) References Cited

U.S. PATENT DOCUMENTS

| | | | |
|---|---|---|---|
| 4,905,163 A | 2/1990 | Garber et al. ............... 364/513 |
| 5,089,952 A | 2/1992 | Bozman ...................... 395/725 |
| 5,121,493 A | 6/1992 | Ferguson .................... 395/600 |
| 5,442,784 A * | 8/1995 | Powers et al. .............. 707/102 |
| 5,590,284 A | 12/1996 | Crosetto ................. 395/200.5 |
| 5,604,772 A * | 2/1997 | Botto et al. ................. 375/341 |

(Continued)

FOREIGN PATENT DOCUMENTS

JP    02001034619 A    2/2001

OTHER PUBLICATIONS

J. Edozien, "eBusiness is Enterprise Application Integration," Arthur Anderson eBusiness Solutions, Jan. 2000, pp. 1-15.

(Continued)

*Primary Examiner*—Cam Linh Nguyen
(74) *Attorney, Agent, or Firm*—Haverstock & Owens LLP

(57) ABSTRACT

A method of and apparatus for applying a parametric search methodology to a searchable database formatted in a directory tree structure. The directory tree structure includes nodes comprising a collection of related data and branches comprising links between the nodes. Each specific node provides a corresponding set of parameters by which each related item of data corresponding to the specific node is defined by initializing the value of each parameter for each related data. The method accesses a particular node within the directory tree structure and performs a parametric search using one or more set search parameters corresponding to the specific node to generate one or more matching discrete data items, wherein each matching item corresponds to related data of the particular node. The parameters can be customizable and specific to the specific node. The method can also include accessing a particular node utilizing a selective one or more search methodologies including keyword search, hierarchical search, and dichotomous key search.

41 Claims, 10 Drawing Sheets

U.S. PATENT DOCUMENTS

| | | | | |
|---|---|---|---|---|
| 5,613,110 | A * | 3/1997 | Stuart | 707/1 |
| 5,696,962 | A | 12/1997 | Kupiec | 395/604 |
| 5,701,467 | A | 12/1997 | Freeston | 395/611 |
| 5,778,367 | A * | 7/1998 | Wesinger et al. | 707/10 |
| 5,781,773 | A * | 7/1998 | Vanderpool et al. | 707/100 |
| 5,873,080 | A | 2/1999 | Coden et al. | 707/3 |
| 5,884,301 | A | 3/1999 | Takano | 707/3 |
| 5,987,446 | A | 11/1999 | Corey et al. | 707/3 |
| 6,009,422 | A | 12/1999 | Ciccarelli | 707/4 |
| 6,067,552 | A | 5/2000 | Yu | 707/501 |
| 6,072,490 | A | 6/2000 | Bates et al. | 345/347 |
| 6,078,866 | A | 6/2000 | Buck et al. | 702/2 |
| 6,078,914 | A | 6/2000 | Redfern | 707/3 |
| 6,094,652 | A | 7/2000 | Faisal | 707/5 |
| 6,098,066 | A * | 8/2000 | Snow et al. | 707/3 |
| 6,133,938 | A * | 10/2000 | James | 725/80 |
| 6,185,550 | B1 * | 2/2001 | Snow et al. | 707/1 |
| 6,185,569 | B1 | 2/2001 | East et al. | 707/100 |
| 6,212,518 | B1 * | 4/2001 | Yoshida et al. | 707/5 |
| 6,226,641 | B1 | 5/2001 | Hickson et al. | 707/8 |
| 6,253,188 | B1 * | 6/2001 | Witek et al. | 705/14 |
| 6,292,796 | B1 | 9/2001 | Drucker et al. | 707/5 |
| 6,292,894 | B1 * | 9/2001 | Chipman et al. | 713/168 |
| 6,327,588 | B1 * | 12/2001 | Danish et al. | 707/3 |
| 6,393,427 | B1 | 5/2002 | Vu et al. | 707/101 |
| 6,418,433 | B1 | 7/2002 | Chakrabarti et al. | 707/5 |
| 6,421,661 | B1 | 7/2002 | Doan et al. | 707/3 |
| 6,421,675 | B1 * | 7/2002 | Ryan et al. | 707/100 |
| 6,424,966 | B1 | 7/2002 | Meyerzon et al. | 707/3 |
| 6,484,165 | B1 * | 11/2002 | Beall et al. | 707/3 |
| 6,499,033 | B1 * | 12/2002 | Vagnozzi | 707/101 |
| 6,513,032 | B1 | 1/2003 | Sutter | 707/3 |
| 6,516,337 | B1 | 2/2003 | Tripp et al. | 709/202 |
| 6,523,021 | B1 * | 2/2003 | Monberg et al. | 707/2 |
| 6,542,593 | B1 | 4/2003 | Bowman-Amuah | 379/201.03 |
| 6,567,800 | B1 | 5/2003 | Barrera et al. | 707/3 |
| 6,631,367 | B2 | 10/2003 | Teng et al. | 707/3 |
| 6,631,496 | B1 | 10/2003 | Li et al. | 715/501.1 |
| 6,691,108 | B2 | 2/2004 | Li | 707/3 |
| 6,704,729 | B1 | 3/2004 | Klein et al. | 707/5 |
| 6,760,721 | B1 | 7/2004 | Chasen et al. | 707/3 |
| 6,826,597 | B1 | 11/2004 | Lonnroth et al. | 709/207 |
| 7,003,514 | B2 | 2/2006 | Dutta et al. | 707/5 |
| 7,080,073 | B1 | 7/2006 | Jiang et al. | 707/7 |
| 7,085,736 | B2 | 8/2006 | Keezer et al. | 705/27 |
| 7,130,861 | B2 | 10/2006 | Bookman et al. | 707/102 |
| 2001/0044837 | A1 | 11/2001 | Talib et al. | 709/219 |
| 2001/0056460 | A1 | 12/2001 | Sahota et al. | 709/201 |
| 2002/0004793 | A1 | 1/2002 | Keith, Jr. | 707/5 |
| 2002/0016793 | A1 | 2/2002 | Keith, Jr. | 707/1 |
| 2002/0016794 | A1 | 2/2002 | Keith, Jr. | 707/1 |
| 2002/0023085 | A1 | 2/2002 | Keith, Jr. | 707/10 |
| 2002/0032672 | A1 | 3/2002 | Keith, Jr. | 707/3 |
| 2002/0046232 | A1 | 4/2002 | Adams et al. | 709/200 |
| 2002/0065812 | A1 | 5/2002 | Keith, Jr. | 707/10 |
| 2002/0073204 | A1 | 6/2002 | Dutta et al. | 709/227 |
| 2002/0091686 | A1 | 7/2002 | Keith, Jr. | 707/1 |
| 2002/0138487 | A1 | 9/2002 | Weiss et al. | 707/10 |
| 2002/0194161 | A1 | 12/2002 | McNamee et al. | 707/2 |
| 2003/0018712 | A1 | 1/2003 | Harrow et al. | 709/203 |
| 2003/0050834 | A1 | 3/2003 | Caplan | 705/14 |
| 2003/0055892 | A1 | 3/2003 | Huitema et al. | 709/204 |
| 2003/0074400 | A1 | 4/2003 | Brooks et al. | 709/203 |
| 2003/0088571 | A1 | 5/2003 | Ekkel | 707/100 |
| 2003/0204578 | A1 | 10/2003 | Yip et al. | 709/222 |

OTHER PUBLICATIONS

A. Goodman, "Quiver: Inktomi on Steroids?," www.traffick.com website, Jul. 2000, pp. 1-3.

"Quiver: Community-Powered Search Solutions," printed from www.quiver.com website on Nov. 22, 2000, 9 pages.

R. Seeley, "Twenty Questions for Saga Software's Andre Yee," eAI Journal, Nov./Dec. 2000, pp. 54-56.

"Blue Martini Customer Interactive System," printed from www.bluemartini.com website on Nov. 22, 2000, 4 pages.

Andrew M. Liao, "Self-adjusting Data Structures: Use Self-adjusting Heuristics to Improve the Performance of your Applications", Dr. Dobb's Journal, pp. 1-9.

"Get Paid to Surf the Web", http://webarchive.org/web/20010405173411/www.thewebaccess.com/submit.html , Apr. 5, 2001, and pp. 1-7.

* cited by examiner

METHOD AND APPARATUS FOR APPLYING A PARAMETRIC SEARCH METHODOLOGY TO A DIRECTORY TREE DATABASE FORMAT

RELATED APPLICATIONS

This application claims priority under 35 U.S.C. § 119(e) of the now abandoned U.S. Provisional Patent Applications Ser. No. 60/188,328 filed Mar. 9, 2000 and entitled "Web Access Network Productivity Tool" and Ser. No. 60/200,963 filed May 1, 2000 and entitled "Web Access Network Productivity Tool." The provisional Patent Applications Ser. No. 60/188,328 filed Mar. 9, 2000 and entitled "Web Access Network Productivity Tool" and Ser. No. 60/200,963 filed May 1, 2000 and entitled "Web Access Network Productivity Tool" are also hereby incorporated by reference.

The following co-owned, co-filed, co-pending U.S. patent applications, Ser. No. 09/801,072, filed on Mar. 6, 2001, and entitled METHOD AND APPARATUS FOR PERFORMING A RESEARCH TASK BY INTERCHANGEABLY UTILIZING A MULTITUDE OF SEARCH METHODOLOGIES, Ser. No. 09/801,138, filed on Mar. 6, 2001, and entitled METHOD AND APPARATUS FOR PERFORMING A RESEARCH TASK BY INTERCHANGEABLY UTILIZING A MULTITUDE OF SEARCH METHODOLOGIES, Ser. No. 09/800,592, filed on Mar. 6, 2001, and entitled METHOD AND APPARATUS FOR FORMATTING INFORMATION WITHIN A DIRECTORY TREE STRUCTURE INTO AN ENCYCLOPEDIA-LIKE ENTRY, Ser. No. 09/799,032, filed on Mar. 6, 2001, and entitled METHOD AND APPARATUS FOR NOTIFYING A USER OF NEW DATA ENTERED INTO AN ELECTRONIC SYSTEM, Ser. No. 09/801,140, filed on Mar. 6, 2001, and entitled METHOD AND APPARATUS FOR ACCESSING INFORMATION WITHIN AN ELECTRONIC SYSTEM, Ser. No. 09/800,566, filed on Mar. 6, 2001, and entitled METHOD AND APPARATUS FOR ACCESSING INFORMATION WITHIN AN ELECTRONIC SYSTEM BY AN EXTERNAL SYSTEM, Ser. No. 09/801,076, filed on Mar. 6, 2001, and entitled METHOD AND APPARATUS FOR ORGANIZING DATA BY OVERLAYING A SEARCHABLE DATABASE WITH A DIRECTORY TREE STRUCTURE are also incorporated by reference.

FIELD OF THE INVENTION

The invention relates to a method of utilizing a parametric search methodology. More particularly, the invention relates to a method of applying a parametric search methodology to a directory tree database format.

BACKGROUND OF THE INVENTION

Information technology (IT) continues to rapidly evolve and with this evolution comes advanced complexity. As new technologies are introduced into enterprise networks, the need to interoperate the new technologies with existing legacy technologies becomes of greater concern and necessity. Enterprises are intrinsically multi-functional in nature, yet applications and systems technologies tend to be single-function entities with closed architectures and proprietary internals. This core incongruence results in disparate, incompatible legacy systems of various kinds, incompatible hardware systems and devices, and heterogeneous platform systems mutually incomprehensible to each other. This phenomenon has been referred to as Enterprise Application Dysintegration, or EAD. As a result, the function of IT is more and more becoming the integration of heterogenous components. Currently, no automated means are available and the integration is effected manually by human agents at great cost, time, and inefficiency. Indeed, with the implementation of a new technology, exists the understanding that in addition to implementation issues associated solely with the new technology comes the downtime, cost, and disruption of re-architecting and re-building currently useful legacy functionality associated with integration.

With new applications and systems also comes associated new data and information that needs to be stored and managed. Also comes the need to integrate legacy data for use by the new technologies. Disparate systems inter-operate effectively through well defined interfaces. To facilitate this inter-operability, heterogeneous syntactic formats need to be translated into well known intermediary formats understood by all systems in the exchange. This is often referred to as syntactic transformation, of which XML is being proposed as the universal intermediary for data exchange. Beyond syntax also lies the meaning of terms, a problem commonly referred to as semantic reconciliation. To address semantic reconciliation, a formal agreement is typically made between communicating systems about the meaning of terms in a particular domain of knowledge and application.

There are many robust technologies for data-level integration, including database-specific Call Level Interfaces (CLIs), Open DataBase Connectivity (ODBC), and Java DataBase Connectivity (JDBC). However, these interface technologies require sophisticated user knowledge and are quite tedious to implement and update.

Although there are database-to-database integration technologies currently available, there is no standard methodology for reusing legacy information with newly introduced technologies. A primary objective is to integrate systems and data without disturbing them. Minimizing any type of data conversion plays to this concept of being non-invasive.

In addition to the problem of integrating new technologies with legacy information is the problem of how to manage and access the explosive growth in the amount of data. Increased memory and remote electronic data storage capacity offers access to large amounts of data in a very convenient form and physical size. Data may be available on diskette, CD-ROM, magnetic tape, and on line to a centrally located computer and memory storage medium. On line access to such stored data is primarily provided by business data networks and the world wide web, hereinafter referred to as the Internet. By 1993, the Internet had approximately 130 sites that could be hyper-linked together with keywords. The Internet has grown quickly since then. Sites on the Internet have increased from approximately 1.6 million at the end of 1997 to 9.6 million at the end of 1999. Today, multiple technologies are available to access and manage data presented on the Internet. The challenge remains to extract information from the data simply and efficiently and to have confidence in the result that all relevant items have been uncovered. To focus in on relevant database records, search engines generally use keywords, categorization, segment limitations, Boolean logic, and hit counts. More complex search engines can also employ hierarchical categorization and multifaceted searching.

Keywords are the basis of most searches. A simple keyword search, such as that found in most word processors under the "Find" command, will locate the occurrence of a text string within a document or a record. Misspellings, synonyms, or different tenses of a given text string will not be located. The searcher must be cautious to truncate the text string to a word's root. A search for the text string "graphical", for instance, will not locate instances of the text string "graphics." The searcher must also not choose commonly occurring words, as such a search would result in a high number of search results. Keywords are commonly combined with categorization, segment limitations, Boolean logic operators, advanced keywording, date operators and numeric operators to create a more effective search.

Categorization is a technique used to focus the scope of a search. A category is a subset of records. By conducting a search only within this subset of records, fewer irrelevant hits result. Lexis-Nexis™ and Dialog™, two online searchable databases with proprietary search engines, are examples of categorized databases. Prior to conducting a keyword search within the Lexis-Nexis™ or Dialog™ database, the searcher must select from an extensive list of categories. Some categories are broader than others. If the searcher selects an overly broad category, his or her search will result in too many irrelevant hits and the searcher will waste time sorting through the undesired search result records looking for relevant hits. If the searcher selects an overly narrow category, his or her search results will not include some of the desired records. Selection of an appropriate category, therefore, is of vital importance.

Searches can be further focused with the use of segment limitations. Such a search is also commonly referred to as a parametric search. "Segments" are similar to categories in that they are domain specific. Category classifications are used to divide multiple records into subsets, or "fields". Segment classifications are used to divide individual records into specific groupings of information. Using segments, or parameters, keyword searches can be targeted at certain fields of a record, such as a record's title or author. Search engines distributed by Lexis-Nexis™ and Dialog™, two online searchable database providers, are well-adapted to such targeted searches, often using dozens of segments for each category of records. A news article record, for instance, is typically broken down into separate fields for byline, date, publisher, abstract, and body. To find a news article with the word "elephant" in the title (or headline) using the classical interface of the Lexis-Nexis™ search engine, the following syntax would be needed: "HEADLINE(elephant)".

Using keyword searching may not be very helpful if the user is not familiar with the appropriate standard terminology related to the information they are looking for. Further, there may be many appropriate ways to describe the information sought by the user. A concept expressed by a standard industry term in one industry may be different from a standard industry term in a different industry. A keyword search would require searching all synonyms used in order to ensure a complete and accurate result.

When a user of a searching/retrieval system enters a keyword search query into a system, the query is parsed. Based on the parsed query, a listing of documents relevant to the query is provided to the user. In the prior art, it is also known to use semantic networks when parsing a query. The number of words used to search the database is then expanded by including the corresponding words or associated words identified by the semantic network in the search instructions. This expansion can be based on any one or a combination of using stems or roots of terms, using sound-a-like words, using wildcard words or any other appropriate semantic technique.

Boolean operators, such as "AND", "OR" and "MINUS", are used to enhance the capabilities of a search engine. The basic format of Boolean queries is well known in the art and generally takes on the form of "X OR Y", where X and Y are two distinct keywords. Because search requests are processed by a computer, syntax rules must be strictly followed when drafting a Boolean keyword search. In many search engines the logical operators "AND" and "OR" must be capitalized. Some search engines allow additional syntax that indicates requisite proximity of keywords or hierarchy within a specific Boolean query. Hierarchy within a Boolean query is usually designated with the use of parenthesis. The "(A OR B) AND © OR D)" query, for instance, finds a first set of records containing "A OR B" and a second set of records containing "C OR D", then finds records included in both the first set and the second set.

Using the Boolean operator "AND" in a search expression such as "X AND Y," will yield records which include both X and Y in the record. Using the Boolean operator "OR" in a search expression such as "X OR Y," will yield records which include either X or Y in the record. Using the Boolean operator "MINUS" in a search expression such as "MINUS X" will yield records which do not include the term X in the record.

A query that is too narrow will result in less than the desired number of records. Correspondingly, a query that is too broad will result in greater than the desired number of records. Immediate user feedback on a specific query helps the searcher construct a better subsequent query. Hit count is perhaps the most effective form of feedback for constructing a better query. If a query is too narrow, the hit count will be very low, possibly even zero. If a query is too broad, the hit count will be very high. Hit count information is used with selected viewing of search results to alert the searcher of mistakes, such as incorrect category or segment choice, or otherwise assist the searcher in drafting more effective queries. Hit counts are generally displayed after a given query is executed. Hit counts are more useful when provided for each search term and each combination of search terms. Boolean Representation One, illustrated below in Table I, demonstrates how individual hit counts can be used for the Boolean keyword search for "(cat OR dog) AND (doctor OR veterinarian)".

TABLE I

Boolean Representation One

```
cat -- 280 ------------
                       |-- OR -- 774 -
dog -- 494 ------------
                                      | -- AND -- 4
veterinarian -- 34 ----
                       |-- OR -- 228 ---
doctor -- 194 ---------
```

In the above example, the hit counts are as follows: in the database the term "cat" is included in 280 records; in the database the term "dog" is included in 494 records; in the database the term "veterinarian" is included in 34 records; in the database the term "doctor" is included in 194 records; in the database the term "cat" or "dog" is included in 774 records; in the database the term "veterinarian" or "doctor" is included in 228 records; and in the database the Boolean query for the Boolean expression "(cat OR dog) AND (doctor OR veterinarian)" results in the location of 4 records. If the Boolean expression is altered by the replacement of "dog" with "cow", the hit count change ripples through the Boolean expression's representation as shown in Boolean Representation Two, illustrated below in Table II.

TABLE II

Boolean Representation Two

```
cat -- 280 ------------
                        |-- OR -- 351 -
cow -- 71 -------------                |
                                       | -- AND -- 1
veterinarian -- 34 ----
                        |-- OR -- 228 ---
doctor -- 194 ---------
```

Feedback from individual hit counts gives the searcher access to information normally hidden. Viewing individual hit counts, a searcher is better able to identify search terms that are too specific, too broad, or misspelled.

An additional search tool is hierarchical categorization. Instead of classifying records into separate categories, hierarchical categories classify records into both broad groupings and progressively narrower groupings. An example of hierarchical categorization is found in biology, where organisms are organized, from broadest to narrowest, by kingdom, phylum, class, order, family, genus, and species. Hierarchical categorization is commonly used in conventional internet search engines, such as those found at the Yahoo!™ and Altavista™ websites. To find information about a specific topic, a search engine user navigates from a list of broad categories through an increasingly more specific list of categories. Once the first category is selected, a search engine typically displays a lower level screen with another list of alternatives. Such navigation continues down through the various menus of alternatives having decreasing priority levels. At any point of the category navigation, a keyword or Boolean search can be performed upon the records in that category. Search results are only obtained from records located within the category searched. Most search engines only allow searches in one category at a time. To search a second category, the searcher must navigate up the hierarchical category tree and then down to the second category.

Multifaceted classification attempts to address the limits of the hierarchical categorization method. Instead of assigning a record to a single category, multifaceted classification allows a record to belong to multiple categories. The multiple categories become part of a record's description, along with standard information for the record such as the title, the abstract (or keywords), the date, and author. Multifaceted classification improves the likelihood of locating relevant records. First, the searcher can take several different paths to locate the same record. Using the analogy of books in a library, multifaceted classification is able to place a single book on more than one shelf. Second, the multiple categories can be subjected to a Boolean query. Records relating to sports medicine could be found by searching for records included in both the sports category and the medicine category.

Boolean logic, segment limitations, hit counts, hierarchical categorization, and multifaceted classification help the searcher create more effective queries, but at the cost of increased complexity. Often instruction manuals or a software program's help menu must be consulted to draft a query. Dialog™, for instance, publishes a "Bluebook" that contains detailed lists of segment codes for each of their many databases. Lexis-Nexis™ goes so far as to provide free online access and training seminars for students to overcome their search engine's initial learning curve.

New generations of technology and methodologies continue to be developed to improve search accuracy and efficiency. Where one generation fails to meet all demands, another generation arises looking to fill the gaps. Each generation has been partially effective, however no generation to date has been entirely effective. In most cases, current technology is a singular approach technique to access and organize information, which at certain times is productive and efficient in accomplishing the intended task. However, all too frequently, the user uncovers no positive search result or receives hundreds, and sometimes thousands, of end search results. In some instances one technology will yield no positive result while another will possibly solve the research task. What is needed is an approach which allows users to employ a simplified means to access, organize, and manage information contained on the Internet and within business data systems. This approach should combine the best search methodologies on the market to provide the most complete solution possible.

What is also needed is a methodology that takes existing, legacy information and allows users to redefine and reorganize the information without requiring a data conversion thus improving the flow of data.

SUMMARY OF THE INVENTION

The invention is a method of and apparatus for applying a parametric search methodology to a searchable database formatted in a directory tree structure. A method of accessing information within a directory tree structure includes steps of formatting a searchable database into the directory tree structure, wherein the directory tree structure includes nodes comprising a collection of related data and branches comprising links between the nodes and wherein each specific node provides a corresponding set of parameters by which each related item of data corresponding to the specific node are defined by initializing a value of each parameter for each related item of data, accessing a particular node within the directory tree structure, setting one or more search parameters corresponding to the set of parameters of the particular node, and performing a parametric search using the one or more set search parameters corresponding to the specific node to generate one or more matching discrete data items, wherein each matching item corresponds to related items of data of the particular node. The parameters can be customizable and specific to the particular node. The step of accessing a particular node is performed utilizing a selective one or more search methodologies including keyword search, hierarchical search, and dichotomous key search. When the utilized search methodology is the keyword search, the search criteria is one or more keywords input by a user. When the utilized search methodology is the hierarchical search, the search criteria is a selected one of a list of one or more directory items. When the utilized search methodology is the dichotomous key search, the search criteria is a selected one of two binary items. The searchable database can be distributed into more than one physical location. The steps of accessing a particular node, setting the search parameters, performing a parametric search can be performed by a server. The method can include the step of establishing an internet connection with the server to perform one or more searches and utilize the parametric search. The method can include the step of maintaining the node by appropriately adding and deleting data to and from the node. The step of maintaining the node can be performed by a node owner who maintains the corresponding node and all nodes that are linked beneath the corresponding node within the directory tree structure.

According to another aspect of the present invention, a research system for accessing information within a directory tree structure includes a research server configured to format a searchable database into the directory tree structure, wherein the directory tree structure includes nodes comprising a collection of related data and branches comprising links between the nodes and wherein each specific node provides a corresponding set of parameters by which each related item of data corresponding to the specific node are defined by initializing a value of each parameter for each related item of data, to access a particular node within the directory tree structure, to set one or more search parameters corresponding to the set of parameters of the particular node, and to perform a parametric search using the one or more set search parameters corresponding to the specific node to generate one or more matching discrete data items, wherein each matching item corresponds to related items of data of the particular node. The parameters can be customizable and specific to the particular node. The research server can access the particular node by utilizing a selective one or more search methodologies including keyword search, hierarchical search, and dichotomous key search. When the utilized search methodology is the keyword search, the search criteria is one or more keywords input by a user. When the utilized search methodology is the hierarchical search, the search criteria is a selected one of a list of one or more directory items. When the utilized search methodology is the dichotomous key search, the search criteria is a selected one of two binary items. The searchable database can be distributed into more than one physical location. The system can include an interface circuit coupled to the research server to establish a connection with a computer system. The connection can be established with the computer system at a remote location from the interface circuit. The connection can be established with the remote computer system and the interface circuit over the internet to allow users to access the research system, to access the particular node, to set the search parameters, and to perform the parametric search. The system can include a node owner for maintaining the node by appropriately adding and deleting related data to and from the node. The node owner can maintain the corresponding node and all nodes that are linked beneath the corresponding node within the directory tree structure.

According to a further aspect of the present invention, a network of devices for accessing information within a directory tree structure includes one or more computer systems configured to establish a connection with other systems, and a research server coupled to the one or more computer systems to format a searchable database into the directory tree structure, wherein the directory tree structure includes nodes comprising a collection of related data and branches comprising links between the nodes, further wherein each specific node provides a corresponding set of parameters by which each related item of data corresponding to the specific node are defined by initializing a value of each parameter for each related item of data, to access a particular node within the directory tree structure, to set one or more search parameters corresponding to the set of parameters of the particular node, and to perform a parametric search using the one or more set search parameters corresponding to the specific node to generate one or more matching discrete data items, wherein each matching item corresponds to related items of data of the particular node. The parameters can be customizable and specific to the particular node. The research server can access the particular node by utilizing a selective one or more search methodologies including keyword search, hierarchical search, and dichotomous key search. When the utilized search methodology is the keyword search, the search criteria is one or more keywords input by a user. When the utilized search methodology is the hierarchical search, the search criteria is a selected one of a list of one or more directory items. When the utilized search methodology is the dichotomous key search, the search criteria is a selected one of two binary items. The searchable database can be distributed into more than one physical location. The one or more computer systems and the research server can be coupled together over the internet to allow users to access the research system, to access the particular node, to set the search parameters, and to perform the parametric search. The system can include a node owner for maintaining the node by appropriately adding and deleting related data to and from the node. The node owner can maintain the corresponding node and all nodes that are linked beneath the corresponding node within the directory tree structure.

The present invention provides an improvement in that a multitude of search methodologies are used to search within a directory tree structure. Data within the directory tree structure and links to related data external to the directory tree structure are accessed utilizing keyword search, hierarchical search, dichotomous key search, and parametric search. A further improvement is provided in that the aforementioned search methodologies can be used in any sequence and at any location within the directory tree structure.

DETAILED DESCRIPTION OF THE PREFERRED EMBODIMENT

Figure 1:
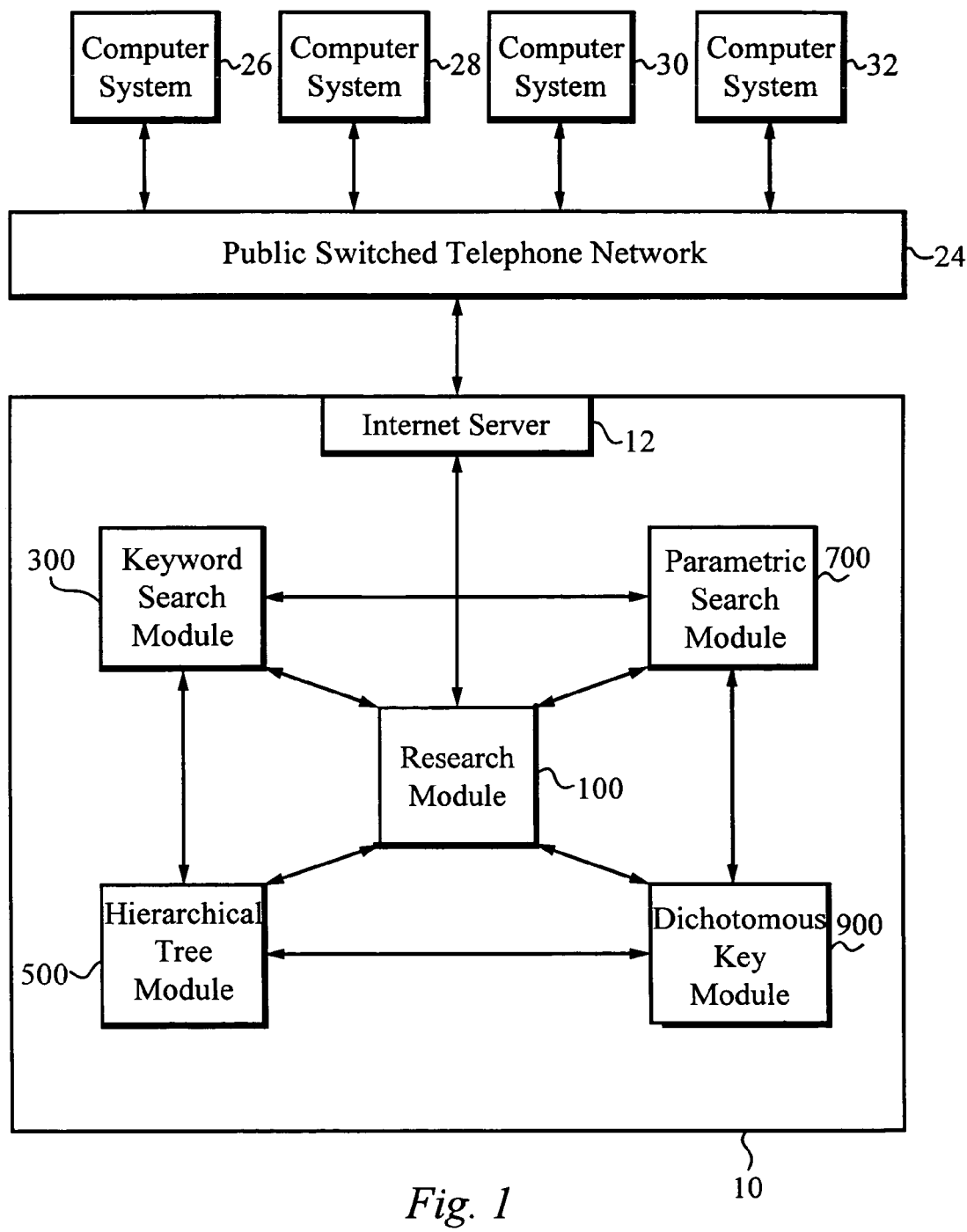
FIG. 1 illustrates a block diagram of a database management and researching system according to the preferred embodiment of the present invention.

The database management and research system of the present invention provides a real time interactive process to manage, redefine, reorganize, access, store, and retrieve information without a need to perform data conversion. The database management and research system preferably provides a customizable directory tree structure that functions with existing networks, security, and infrastructure. The directory tree structure of the preferred embodiment of the present invention overlays and points to existing data thereby providing the necessary management and access processes relative to the existing data. The directory tree structure preferably includes nodes which represent html addresses and branches which represent links from an html address of one node to an html address of another node. Since these processes do not require the need for data conversion, the present invention produces a cost savings by deferring the cost of a conversion and an improved efficiency by reducing the overall time to implement a new database management and research technology.

A research system of the present invention bundles and enhances four database searching technologies to better manage and organize information on the Internet or within an organization's own proprietary data storage system. It will be clear to those skilled in the art that the source of such information can be stored locally, remotely, centrally or can be distributed across multiple storage systems. The database searching technologies utilized within the present invention include keyword search, hierarchical tree, customizable parametric search, and dichotomous key. The utilization of the combination of these database searching technologies within the database management and research system of the present invention enables a user to retrieve very specific and categorized information.

Keyword searching is a standard utility used to scan a directory or the content of documents. Many Internet users believe that all Internet searches follow this technique. A keyword, or keywords, search can be used to scan an entire directory of information sources or search complete documents for a specific string or strings of characters.

A hierarchical tree structure is basically a decision tree structure that can have multiple nodes, like junctions of limbs on a tree. This structure is similar to those used by Internet directories, such as Yahoo!™ or LookSmart™. A limitation with these technologies is that they are not always designed to index discrete items of information. As a result, the search may not contain descriptive information about each item of interest.

Customizable parametric search technology allows users to precisely locate desired information by searching the parametric data that is contained within each node of the tree structure. Parameters will include information type and target use of the information. For example, if a user is seeking a house of desired parameters (location, size, price, age), this search technique is reliable. The options for search topics and parameters are endless.

A dichotomous key structure is a binary key structure or two-node tree. This structure is used as a decision tree mechanism to instruct users in deciphering information given in an answer or question dialog, often a yes or no answer. Examples of this include diagnosing a medical disease, diagnosing a mechanical problem, and working a system such as classifying a biological species by physical attributes.

The database management and research system of the present invention improves research accuracy and provides data management methodology that reduces costs and the time users spend finding the desired objective. As previously discussed, in most cases, current technology is a singular approach technique. This singular approach technique is productive on occasion; however, all too frequently, the user uncovers no positive result or receives an excessive number of search results. In either case, had a different technology been employed a positive result may have been achieved. The research system of the present invention enables the user to quickly and easily jump from one technology to another to maximize the benefits of using multiple approach techniques.

The database management and research system is a tool designed specifically to manage information. It is designed to organize and co-ordinate all information contained within a database. As used herein, the term database refers to a single collection or database, either previously existing or generated, as well as a collection of multiple databases, such as the Internet. It will also be obvious to someone skilled in the art that the research system is capable of managing quantities of data both large and small as compared to the Internet. The research system organizes this information into a coherent and orderly data structure to allow simple retrieval of data within the database. The preferred data structure is a directory tree structure, which will be described in detail below. This system also monitors changes to the internal structures and communicates updates and additions of this information structure to users in their chosen areas of interest. Within the research system, cross-links are utilized such that related nodes are explicitly linked as a "related topics" data structure within the directory tree. This is markedly different from other systems in that each node of the tree can focus on more discrete topics of information, for example creating cross-links that are more discrete. In addition, the preferred embodiment of the research system converts from one of the four basic search technologies to another, and then convert again to another, while in the same search investigation. This provides significant advantage over conventional single approach technologies through improved search effectiveness and increased efficiency in both time and effort.

A block diagram of a researching system according to the preferred embodiment of the present invention is illustrated in FIG. 1. A controller 10 includes an internet server 12, a research module 100, a keyword search module 300, an hierarchical tree module 500, a parametric search module 700, and a dichotomous key module 900. The research module 100 is coupled to the internet server 12, to the keyword search module 300, to the hierarchical tree module 500, to the parametric search module 700, and to the dichotomous key module 900 to provide communications between the controller 10 and users accessing the researching system. As used herein, the term user includes one or more of an individual, groups of individuals, association, corporation, agency, or any other person or entity accessing the researching system to access, organize, retrieve, and manage information contained on the Internet and within a database.

The keyword search module 300, the hierarchical tree module 500, the parametric search module 700, and the dichotomous key module 900 are each coupled to each other to enable the user to quickly and easily jump from one search methodology to another while performing a research task.

The controller 10 is coupled to the public switched telephone network 24 to allow communications between the internet server 12 and the users' computer systems 26-32. Using the computer systems 26-32, users have the ability to establish a connection with the research module 100 to perform a desired research task. Preferably, this connection is established between the users' computer systems 26-32 and the controller 10 over the internet through the public switched telephone network 24. Alternatively, this connection is established by any appropriate connection including a direct connection over the public switched telephone network 24 or over a dedicated intranet network.

Figure 2:
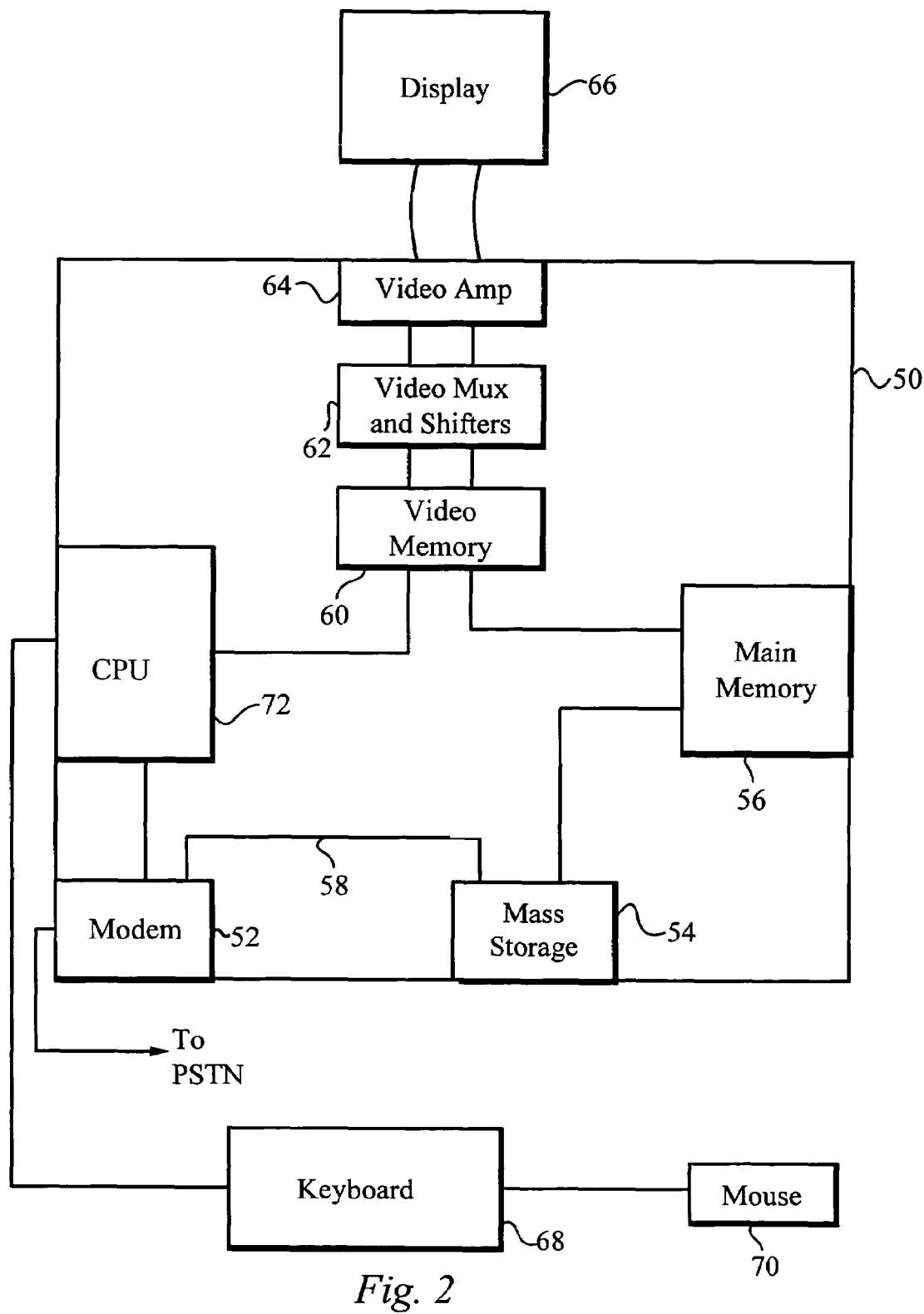
FIG. 2 illustrates a block diagram of the internal components of exemplary computer systems used to access the controller of the preferred embodiment of the present invention.

A block diagram of the internal components of the computer systems 26-32 used by users to access the controller 10 of the present invention is illustrated in FIG. 2. While the controller 10 can be accessed from any appropriately configured computer system or internet access device, an exemplary computer system 50 for accessing the controller 10 is illustrated in FIG. 2. The exemplary computer system 50 includes a CPU 72, a main memory 56, a video memory 60, a mass storage device 54 and a modem 52, all coupled together by a conventional bidirectional system bus 58. The modem 52 is preferably coupled to the public switched telephone network 24 for sending and receiving communications. The mass storage device 54 may include both fixed and removable media using any one or more of magnetic, optical or magneto-optical storage technology or any other available mass storage technology. The system bus 58 contains an address bus for addressing any portion of the memory 54, 56 and 60. The system bus 58 also includes a data bus for transferring data between and among the CPU 72, the main memory 56, the video memory 60, the mass storage device 54 and the modem 52.

The computer system 50 is also coupled to a number of peripheral input and output devices including the keyboard 68, the mouse 70, and the associated display 66. The keyboard 68 is coupled to the CPU 72 for allowing a user to input data and control commands into the computer system 50. A conventional mouse 70 is coupled to the keyboard 68 or computer system 50, directly, for manipulating graphic images on the display 66 as a cursor control device in a conventional manner. The display 66 displays video and graphical images generated by the computer system 50.

A port of the video memory 60 is coupled to a video multiplex and shifter circuit 62, which in turn is coupled to a video amplifier 64. The video amplifier 64 drives the display 66, when it is being used. The video multiplex and shifter circuitry 62 and the video amplifier 64 convert pixel data stored in the video memory 60 to raster signals suitable for use by the display 66.

One advantage of the database management and research system of the present invention over conventional search techniques lies in the ability of the research module 100 to run discrete searches, the ability to separate information that is typically not able to be separated. For example, a computer hardware manufacturer would like to provide potential customers a way to answer questions regarding their products. Previously they were able to provide for a way that they could show product areas to their customers, but their site did not provide the functionality to search on more specific items. Using technology provided by the database management and research system of the present invention, users can locate information on discrete product part numbers so customers can obtain complete product information more quickly, and make faster and more educated purchasing decisions.

The powerful discrete searching capability of the research system can be compared to a trip to a common grocery store. In a typical searching methodology you may have the ability to search by aisle. The user knows that they are looking for Del Monte™ string beans. Their search takes them to the aisle of "canned fruits and vegetables". They may be able to narrow their search, by using boolean logic, to the section of the aisle where there are canned vegetables. Using conventional means, it is now up to the user to search through the various types of vegetables to find specifically what they are looking for. However, the ability to locate discrete items within the research system of the present invention will allow the user to go to the aisle of the "canned fruit and vegetables" and then continue refining the search. By utilizing dichotomous keys the engine will ask whether the user is interested in "fruits" or "vegetables". After choosing vegetables, the user may choose "beans" from a list of related topics corn, beans, peas, etc. After choosing beans, the user may enter a keyword that they are searching for, e.g. "Del Monte". They may continue this type of questioning until finding the exact, discrete item that they are searching for.

The system ultimately provides a method for the user to retrieve information regardless of how specific. The user has multiple methods of locating data: either via an encyclopedia interface, a multi-node tree classification system, a decision tree dialog, via cross-links (related topics), a keyword search system, or using parametric search attributes.

As previously discussed, the information within the research system is organized into a directory tree structure. The directory tree structure includes nodes and branches. A node is considered a discrete category. The nodes are collections of related data and branches are links between nodes. As used herein, the term data preferably refers to web-based multimedia that includes sound, video, graphics, and appropriately formatted text. Appropriately formatted text can include, but is not limited to, word documents, excel documents, powerpoint documents, mechanical drawings, and any document or file rendered by a personal computer or a workstation. It should be clear to one skilled in the art that data can also include discrete appropriately formatted and independently accessible data items, files, and applications with associated URLs and web interface stored in human resource databases, financial and accounting databases, manufacturing databases, order processing and fulfillment databases, customer service databases, sales and marketing databases, and other similar databases or data file formats. The top of the directory tree structure includes nodes of the most general type of information, whereas the bottom of the directory tree structure includes nodes of the most specific type of information. As a user moves down the directory tree structure, the nodes at a next lower level will include more specific information than the nodes of the previous higher level. The converse is also true, as a user moves up the directory tree structure, the nodes at the next higher level will include more general information than the nodes on the previous lower level. As new information is added to the research system, the new information is assigned to a node. Each node preferably includes an encyclopedia listing, definition, related topics, and keywords. Nodes are also preferably cross-linked to related topics which enables users to navigate laterally within the directory tree structure. As users navigate the directory tree structure, the display screen indicates where the users are within the directory tree structure and suggests other related links. A more detailed description pertaining to construct and formation of the directory tree structure will be discussed below.

The research module 100 performs discrete research tasks using any combination of the four search technologies including keyword search, hierarchical tree search, parametric search, and dichotomous key search, as discussed above. Such combinations can include one, two, three, or all four search technologies to accomplish any one research task.

The specific embodiments of these combinations will be discussed in greater detail below.

Keyword Search Module

Referring to the keyword search module 300 in FIG. 1, the data in the directory tree structure can be searched using the following keyword search options: search link descriptions, search keywords for nodes, and search contents of the link. In the search link descriptions search, the keyword search module 300 will search only the descriptions of the link objects. In the search keywords for nodes search, the keyword search module 300 searches the keywords located at each node of the directory. For example, searching for "car" will lead to the "automobiles" node in the directory. In the search contents of the link search, the keyword search module 300 will traverse the directory down to each link path, and upload each page, object, or entire site and store the contents into the search database. This database will be used for the content keyword search. The location within the directory will be stored with each link in the search database in able to narrow the search down to the specific branch of the directory.

Keyword searches selected at a location within the directory tree structure will only contain results from that node of the directory or below, the further down the directory tree, the narrower the search.

Applying the keyword search to the directory tree structure provides many advantages over conventional search methodologies. Keyword searches are available on multiple sets of data including tree categories that are specific to each tree node, topic descriptions maintained external to the web objects, and web page or object content search. Using a keyword search within the directory tree structure keeps the user within the tree as opposed to a link outside the system. Most conventional searches provide a list of links and when the user chooses a link they are taken to that website, typically a website external to the location at which the search was performed. With the research system of the present invention, the user receives a list of matches but when an item is selected the user is taken to a node on the directory tree structure or to the encyclopedia.

The concept is to include as much data as possible within the system as opposed to pushing the user outside the system via links to other websites. Although the research system does provide links to external web sites, the objective is to include enough data within the research system to enable the user to complete the research task without need of linking to external web sites. Maintaining data within the research system controls performance and how clean the data is. This concept applies to the entirety of the research system.

The keyword search technology utilizes a natural language processor that maps the search request to the query language of the research system. A keyword search can be utilized at any point within the research task. To use the keyword search, first the user does a "find" operation. The user inputting the keyword(s) to be searched for into a text field accomplishes a find. The keyword search module 300 performs a fuzzy keyword search on all topics within the directory. Each match will take the user to the node that matches the search criteria. Sometimes the result will be a list, i.e. you search on "tennis" and the resulting list might be "tennis", "tennis shoes", "tennis racquet", etc.

Figure 3:
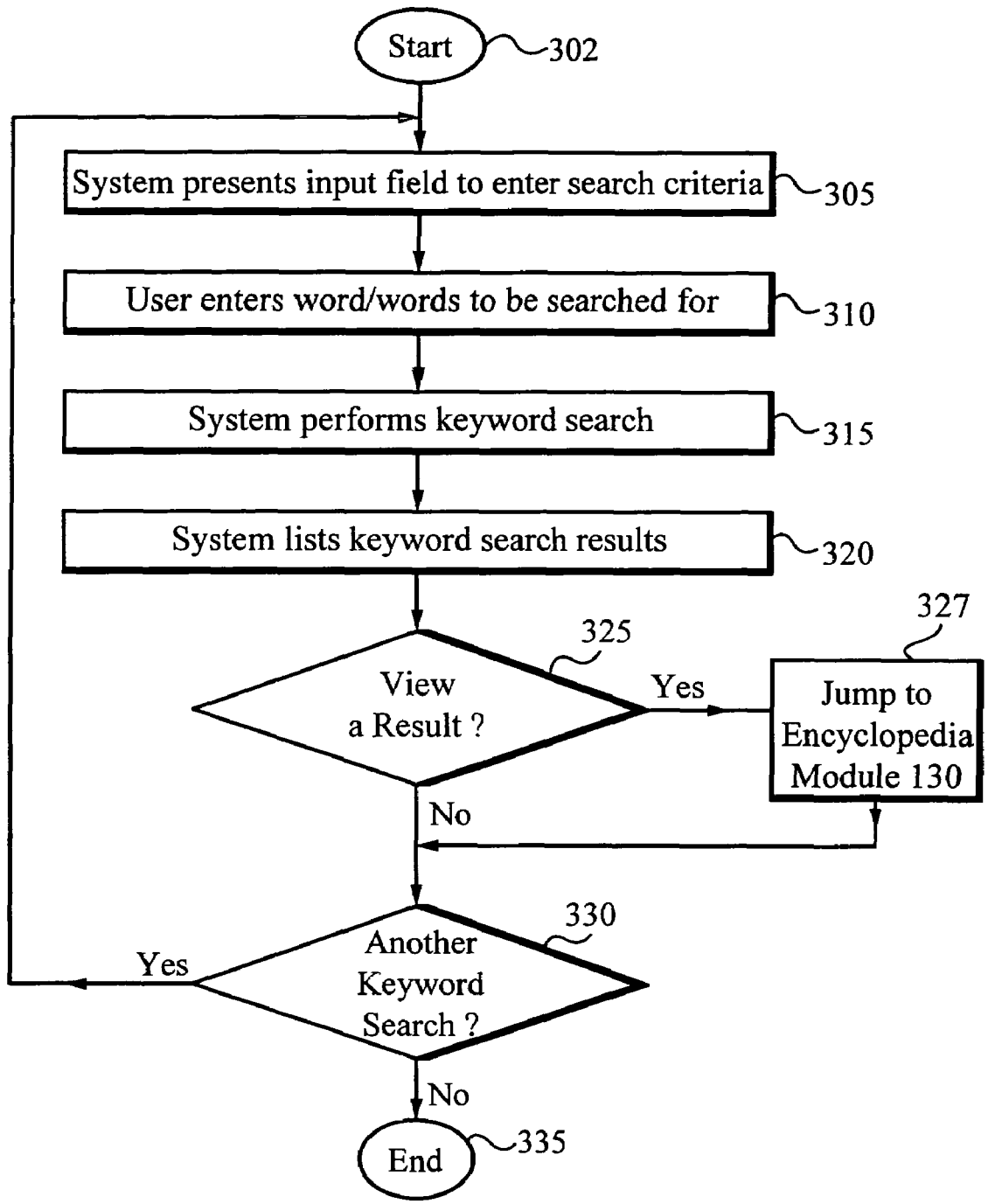
FIG. 3 illustrates a flowchart showing the process used when a user accesses the keyword search module of the present invention.

A flowchart illustrating the process used when a user accesses the keyword search module 300 is illustrated in FIG. 3. The process of FIG. 3 starts at the step 302. At the step 305, the system presents an input field to enter a search criteria. The input field is preferably a text field, but the input field can be any means by which the system can retrieve a keyword(s) to be used to perform a keyword search. At the step 310, the user enters the keyword(s) to be used as the search criteria. The keyword(s) are entered into the text field presented in the step 305. At the step 315, the research system performs the keyword search. The keyword search is performed by matching the search criteria that was input at the step 310 to the data in the research system to generate a list of matches. At the step 320, the research system lists the search results, the search results are the list of matches generated at the step 315. At the step 325, it is determined if the user would like to view a result of the search. The user indicates the desire to view a result by selecting one of the results listed in the step 320. Preferably, the result is selected by using a computer mouse to "double-click" on the desired result in the conventional manner. If it is determined at the step 325 that the user does want to view a result, the process jumps to an encyclopedia module 130 (FIG. 7) at the step 327. The encyclopedia module 130 formats the related data of the selected result into an encyclopedia-like page. The selected result preferably corresponds to a particular node within the directory tree structure. The encyclopedia page will be discussed in greater detail below. If it is determined at the step 325 that the user does not want to view a result or after the system has accessed the encyclopedia module 130, it is determined at the step 330 if the user wants to perform another keyword search. If it is determined at the step 330 that the user does want to perform another keyword search, then the process jumps back to the step 305. If it is determined at the step 330 that the user does not want to perform another keyword search, then the keyword search process ends at the step 335.

Hierarchical Tree Module

Referring to the hierarchical tree module 500 in FIG. 1, each node within the directory tree structure is organized into a hierarchical tree structure, also commonly referred to as a directory. Directories are useful in situations of selecting from an alphabetized list. Simply list A through Z and the user chooses a specific letter. A directory corresponding to the specific letter chosen by the user is presented. The user is once again allowed to choose a selection, and so on. Conventional directories are typically short on descriptions and simply list available links.

Within the research system of the present invention, a directory preferably has a title and short description with a collection of links. Combined with the encyclopedia, to be discussed below, a more robust list including detail with text and graphics is provided.

Figure 4:
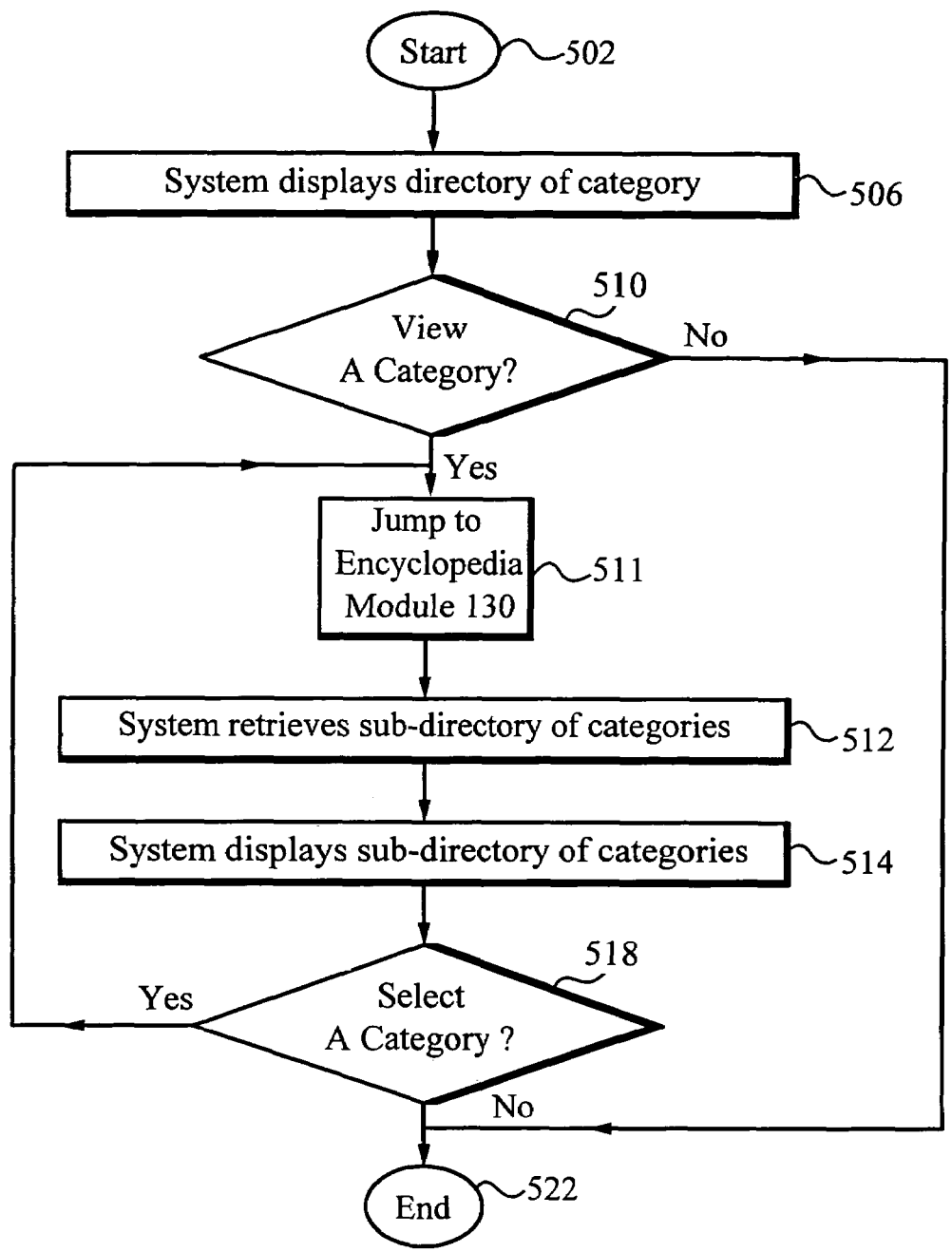
FIG. 4 illustrates a flowchart showing the process used when a user accesses the hierarchical tree module of the present invention.

A flowchart illustrating the process used when a user accesses the hierarchical tree module 500 is illustrated in FIG. 4. The process of FIG. 4 starts at the step 502. At the step 506, the system displays a directory of categories. The specific directory to be displayed is dependent upon the current node within the directory tree structure at which the user currently resides. If the user is at the highest node in the directory, the main directory of categories is displayed. If the user is at a lower node in the directory, the corresponding directory of categories for that node is displayed. At the step 510, it is determined if the user wants to view a specific category. The user can select a category from the directory of categories currently displayed from the step 506. The user indicates the desire to view a category by selecting one of the categories listed in the step 506. If it is determined in the step 510 that the user wants to view a category, the process jumps to the encyclopedia model 130 (FIG. 7) at the step 511. The encyclopedia module 130 formats the related data of the selected category into an encyclopedia-like page. After the process jumps to the encyclopedia module 130, at the step 512 the system retrieves a subdirectory of categories. The subdirectory of categories is the directory of categories associated with the node of the category selected at the step 510. At the step 514 the system displays the subdirectory of categories. At the step 518, it is determined if the user wants to view a specific category of the subdirectory of categories currently displayed from the step 514. If it is determined at the step 518 that the user wants to view a category, then the process jumps back to the step 511 to jump to the encyclopedia module 130. If it is determined at the step 518 that the user does not want to view a category or if it is determined at the step 510 that the user does not want to view a category, then the hierarchical tree process ends at the step 522.

Parametric Search Module

Referring to the parametric search module 700 in FIG. 1, each node includes a list of parameters that are specific to that node. This list is customizable. For example, on a real estate website, search on price, location, # bedrooms and you will be provided a list of entries that match all search criteria. When new information is added to the research system it is necessary to specify, or set, the value of each parameter specific to each entry. The types of parameters include, but are not limited to, true-false, selected list, range of values, and alphabetic list.

Only certain users are granted permission to add new information to the research system. The details as to how new information is added to the research system will be discussed below. In an example of adding new information, one parameter might be "type" and the choice of type might be "white paper", "article", "book", etc. The user will then provide which type the new item is. All parameters will be provided by the user in this manner. Accordingly, at a particular node within the directory, a user can utilize a parametric search to further define and obtain only the desired information from the information available at the node.

Each area in the directory tree structure provides different technology. As a user moves down the tree, the technology provides more specific information. For example, if a user is at a high node in the tree, such as "music", and the user uses one of the four aforementioned search technologies to move down the tree, first to a mid-level node "classical music" and finally to a bottom node "Bach". At the "Bach" node, the user can run a parametric search for specific items related to "Bach".

Figure 5:
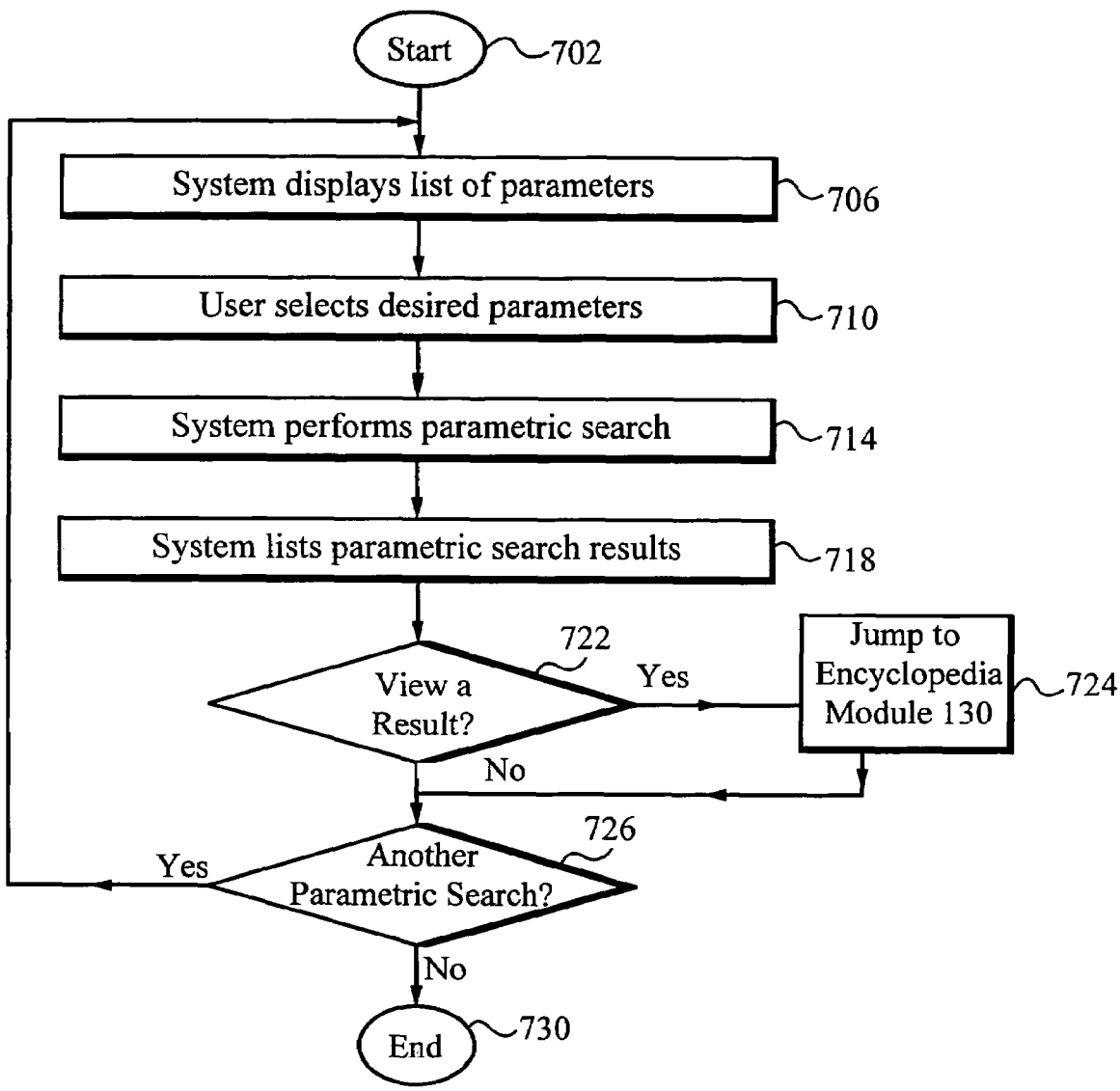
FIG. 5 illustrates a flowchart showing the process used when a user accesses the parametric search module of the present invention.

A flowchart illustrating the process used when a user accesses the parametric search module 700 is illustrated in FIG. 5. The process of FIG. 5 starts at the step 702. At the step 706 the system displays a list of parameters. The specific parameters to be displayed are dependent upon the node at which the user is located when the user accesses the parametric search module 700. At the step 710, the user inputs the desired search parameters. It is preferred that the search parameters are entered into a text field or selected from a drop-down menu, although it should be apparent to someone skilled in the art that other conventional means of data input can be used. In the step 714, the research system performs a search based on the input search parameter from the step 710. At the step 718, the research system displays a list of the matching results from the search performed in the step 714. At the step 722, it is determined if the user wants to view a result from the list of matching results displayed in the step 718. The user indicates the desire to view a matching result by selecting one of the matching results listed in the step 718. If it is determined at the step 722 that the user wants to view a result, then the process jumps to the encyclopedia model 130 (FIG. 7) at the step 724. The encyclopedia module 130 formats the related data of the selected result into an encyclopedia-like page. If it is determined at the step 722 that the user does not want to view a result or after the system has accessed the encyclopedia module 130, it is determined at the step 726 if the user wants to perform another parametric search. If it is determined at the step 726 that the user does want to perform another parametric search, then the process jumps back to the step 706. If it is determined at the step 726 that the user does not want to perform another parametric search, then the parametric search process ends at the step 730.

Dichotomous Key Module

Referring to the dichotomous key module 900 in FIG. 1, the directory tree structure can be organized into a dichotomous key (binary key) structure. Such a structure is advantageous because of its flexibility for growth and ease of use. Flexibility for growth is accomplished because node splits are made easily and can be done "on-line" while the system is running and also during other updates. Users are also less likely to notice a binary split verses a larger split.

In conventional directory structures, where there are multiple entries per node, users can easily become lost. As directories grow and become more complicated, decisions become more difficult and choosing between two paths associated with a dichotomous key structure verses many paths associated with directory structures is simpler. Therefore, the dichotomous tree structure improves ease of use for the user.

Dichotomous tree structures are not without their limitations, and as such, these limitations need to be accounted for. One problem of a dichotomous key structure is that navigating this structure is more cumbersome when users are looking for simple topics on smaller directories such as shopping, entertainment, etc.

Another problem with dichotomous key structures is that some objects are either ambiguous or not obvious as to which category or node path they belong. An example is the pepper. If the choice is between fruit and vegetable, to which does the pepper belong? The answer is fruit, but many may not know this.

The present invention addresses the problems associated with the dichotomous key structure by building a dichotomous decision tree within the directories of the directory tree structure. Such a structure enables users to break out of the dichotomous key at the corresponding level within the directory tree structure. This corresponding level is typically a specific node. At this specific node, doing keyword searches, hierarchical tree searches, or parametric searches of various types is restricted to that portion of the directory. The tree structure can point to the same object via multiple paths which is valuable for objects that have more than one category or use. Also, each node contains keywords for navigational help. These solutions, and others, will be discussed in greater detail below.

As is the case with the directory tree structure as a whole, within the dichotomous decision tree the higher the level the more general the information. When navigating down a dichotomous key structure, each lower node splits the knowledge base in half. If a user does break out of the tree to perform a keyword search, the search is performed only on the remaining information below the node.

The dichotomous key structure uses a binary search and is good for use when the user is not familiar with what the lower end nodes are. For example, if the top node is medical diseases and bottom nodes are specific medical diseases, a user makes binary decisions based on symptoms to reach a diagnosis. The dichotomous key structure is also used in help desk environments to help end users solve problems, and in scientific classification. The dichotomous key structure is not so good when nodes are obvious, i.e. top node is shoes and bottom nodes are tennis shoes, dress shoes, boots, etc. Dichotomous key is also not so good in A-Z decisions. It would be tedious to make multiple decisions like choosing between A-M and N-Z and so on to reach the desired letter.

An example of categories from general to specific within a dichotomous key structure follows:

Everything→Organic→Vegetable→
Plant→Tree→Evergreen→Tuber-Leaf→Juniper

Other examples of useful dichotomous key search applications are: at the node for "fiction", the dichotomous key selections are "fiction books" and "fiction other than books", or at the node for "Mercedes-Benz" and the dichotomous key selections are "Mercedes-Benz Dealers" and "Mercedes-Benz Models".

Figure 6:
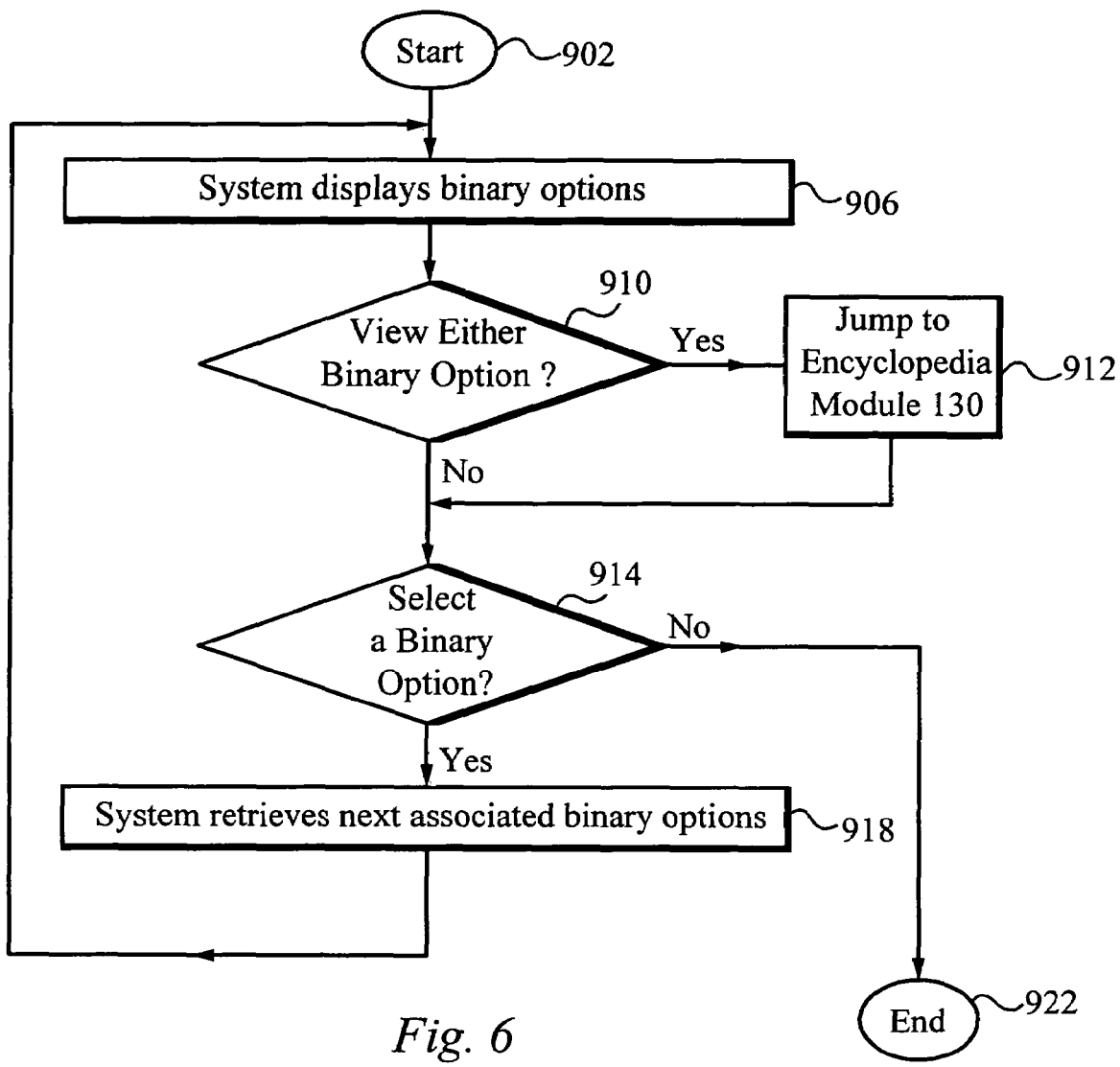
FIG. 6 illustrates a flowchart showing the process used when a user accesses the dichotomous key module of the present invention.

A flowchart illustrating the process used when a user accesses the dichotomous key module 900 is illustrated in FIG. 6. The process of FIG. 6 starts at the step 902. At the step 906 the system displays two binary options, one of which is to be selected by the user. The specific binary options to be displayed are dependent upon the node at which the user is located within the dichotomous key structure. At the step 910, it is determined if the user wants to view either of the binary options displayed in the step 906. If it is determined at the step 910 that the user does want to view one of the binary options, then the process jumps to the encyclopedia module 130 (FIG. 7) at the step 912. The encyclopedia module 130 formats the related data of the selected binary option into an encyclopedia-like page. If it is determined at the step 910 that the user does not want to view either of the binary options or after the system has accessed the encyclopedia module 130, it is determined at the step 914 if the user wants to select one of the two binary options displayed in the step 906. By selecting one of the binary options, the user is indicating that they want to move down one level in the dichotomous key structure. The user indicates a desire to select one of the binary options by double-clicking on one of the binary options in the conventional manner. If it determined at the step 914 that the user wants to select a binary option, then at the step 918 the system retrieves the next associated binary option pair, where the next binary pair resides at one level down the dichotomous key structure from the binary option pair currently displayed in the step 906. After the step 918, the process jumps back to the step 906. If it is determined at the step 914 that the user does not want to select one of the two binary options, then the dichotomous key process ends at the step 922.

Research Module

Figure 7:
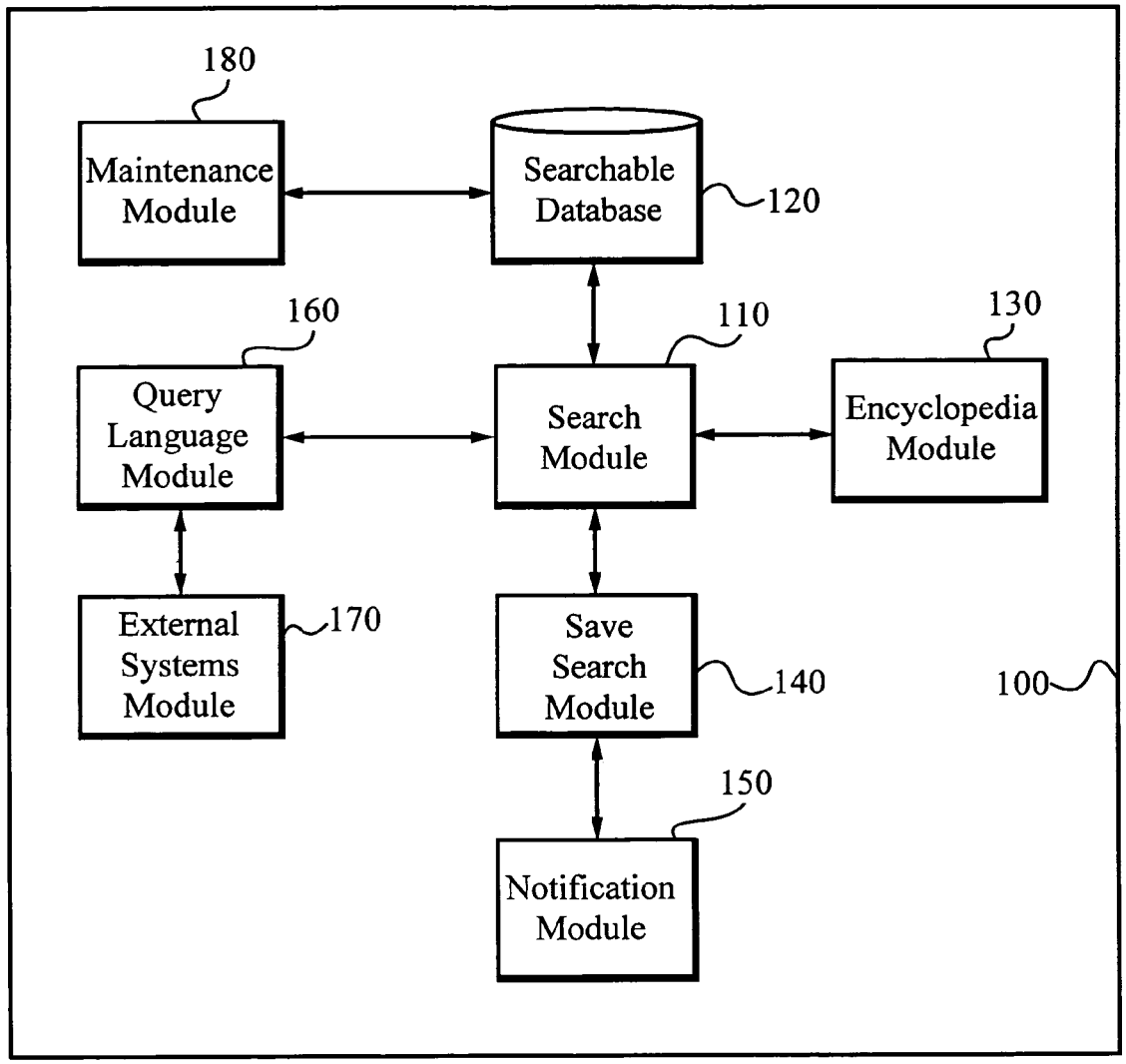
FIG. 7 illustrates a block diagram of the research module of the present invention.

A block diagram of the research module 100 according to the preferred embodiment of the present invention is illustrated in FIG. 7. The research module 100 includes a search module 110, a searchable database 120, a maintenance module 180, the encyclopedia module 130, a save search module 140, a notification module 150, a query language module 160, and an external systems module 170. The search module 110 is coupled to the query language module 160 to format the search request in a query language that the research system can interpret. The search module 110 is coupled to the encyclopedia module 130 to format the collection of data corresponding to a specific node into an encyclopedia-like format. The search module 110 is coupled to the searchable database 120 to access the available searchable data. As described above, the searchable database 120 can be local, remote, central or distributed across multiple storage systems. The searchable database 120 can also include data accessible by the Internet or an intranet network. The maintenance module 180 is coupled to the searchable database 120 to manage and organize new and existing information within the searchable database 120. The external systems module 170 is coupled to the query language module 160 to provide external system access to the search module 110. The save search module 140 is coupled to the search module 110 to save a navigation path and set parameters used in the search module 110 to perform a specific research task. The notification module 150 is coupled to the save search module 140 to notify users that desired information has been added to the searchable database 120.

The search module 110 performs the research task, the research task being accomplished by utilizing the search methodology specified by the user. As discussed above, the search methodologies include keyword search, hierarchical tree, parametric search, and dichotomous key. The search module applies the specified search methodologies to system accessible data to provide the desired search results. Preferably, the accessible data resides in the searchable database 120.

The searchable database 120 includes data accessed by the search module 110. Data within the searchable database 120 also includes links to data external to the research system. In the preferred embodiment of the present invention, the searchable database 120 is a distributed database which resides internal to the research system of the present invention. It should be clear to those skilled in the art that the searchable database 120 can be a centralized database. It should also be clear to those skilled in the art that the searchable database 120 can reside external to the research system of the present invention.

The encyclopedia module 130 includes an encyclopedia. Each node in the directory tree structure is linked to an encyclopedia page. An encyclopedia page provides a description of product or data relevant to the corresponding node that is managed by an author, business, or organization. The information within the system, or data residing within the searchable database 120, is presented to users as an alphabetical list of topics from which to choose. Listings can be expanded to reveal graphics and information. Listings can also be linked to create relationships with listings on other encyclopedia pages. Links are submissions by users within the topic. This access method can either lead a user to the information required, or be a quick-start method to get to a specific area of information. Each node within the hierarchical structure and each link listed at each node of the tree has the ability to store extended textual or html data. This allows information within the research system to be useable without users having to leave the system.

Figure 8:
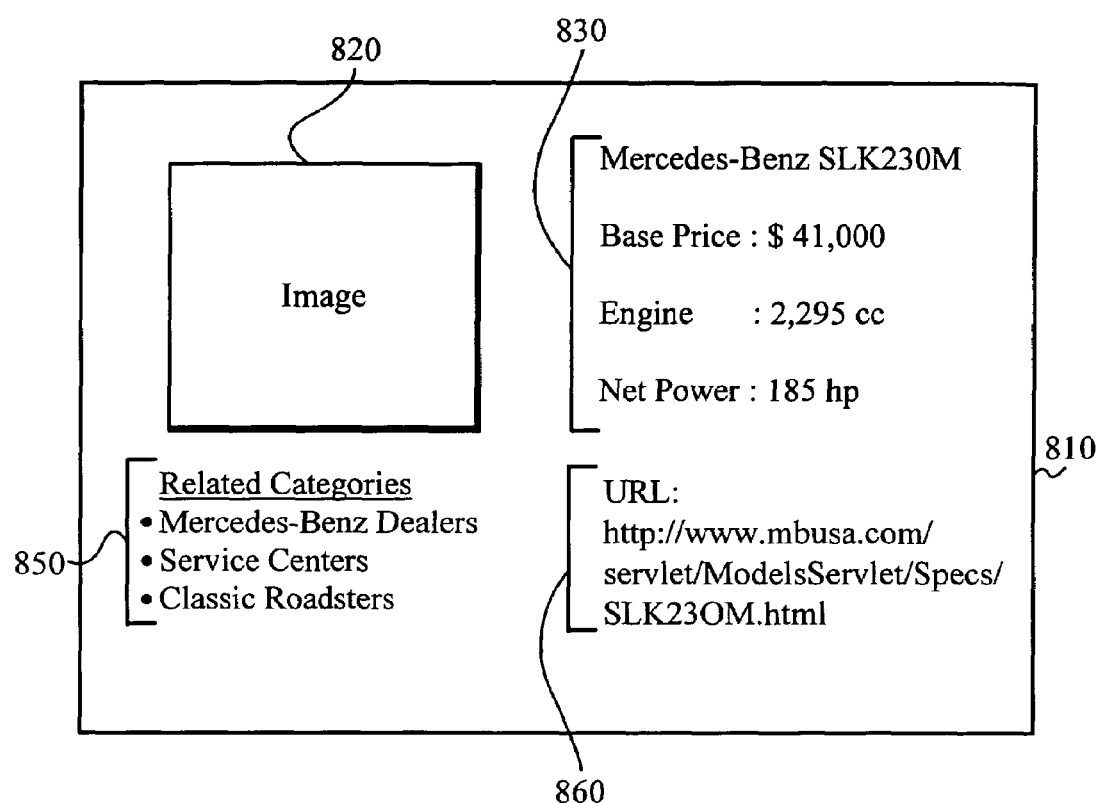
FIG. 8 illustrates an exemplary encyclopedia page provided by the encyclopedia module of the present invention.

An exemplary encyclopedia page 810 provided by the encyclopedia module 130 is illustrated in FIG. 8. The encyclopedia page 810 corresponds to a Mercedes-Benz/Models/Roadsters node within the directory tree structure of the present invention. Although the encyclopedia page 810 corresponds to the Mercedes-Benz/Models/Roadsters node, it should be clear that information within the directory tree structure can be re-organized in such a manner that the encyclopedia page 810 corresponds to a different node. The encyclopedia page 810 includes a graphics section 820, a text section 830, a cross-links section 850, and an external links section 860. The graphics section 820 includes gif, jpeg, mpeg or other appropriately formatted images and videos. The text section 830 includes descriptive text, listings, definitions, etc. The cross-links section 850 includes links to other related nodes within the directory tree structure. When a cross-link to another node is selected, the encyclopedia page corresponding to the linked node is displayed. In this manner, a user can jump from encyclopedia page to encyclopedia page to encyclopedia page and so on. The external links section 806 includes links to related topics and subject-matter that resides external to the directory tree structure. Preferably, these external links are URL's corresponding to external websites. It should be clear that other relevant information can be included within the encyclopedia page 810. Although each section 820, 830, 840, and 850 is illustrated as a single distinct section, it should be clear that each section 820, 830, 840, and 850 can include multiple similar sections, where each section can be displayed anywhere within the encyclopedia page 810. It should also be clear that the encyclopedia page 810 can be opened as a stand-alone window or as a section of a larger window. In either case, the window can be larger than the display screen whereby the user can view the entire encyclopedia page by scrolling in the conventional manner.

The save search module 140 enables users to receive the most current and updated information on any topics of their choice. This is accomplished by saving the navigation path through the directory tree structure and the set parameters of a search so that the exact same search can be done at any time. In this way users can also choose to have new information sent to them regarding their chosen topic. Once the parameters have been saved, the same search can be performed again and again, either at the time the search is saved or at a later date with parameters to be set such as the period between searches and the notification method. The available notification methods include pushing the search results to the desired user through email or other notification as discussed below.

The user also has the capability of saving research criteria inside a personal profile similar to a "favorite". This allows the user to repeat the search on a regular basis. Some examples of this repeated search include a purchasing agent who wants to know the latest prices posted within his/her areas of purchasing responsibilities and a scientist routinely researching his areas of expertise for new developments.

The notification module 150 automatically distributes newly entered information within a particular node or category of the directory tree structure to a user over the computer network. The user has the ability to define nodes, categories and parameters of information in which they are interested. When new information meeting the defined criteria is entered into the decision tree or database structure, the system automatically forwards a notice of this newly entered information to the user. This notice is forwarded by one or more methods of notification including over a bulletin board, through an e-mail message, as a news item directed to the user when the user next accesses the directory, and on a desktop interface through which the user is accessing the directory.

As a user is performing a research task, the search request, or procedure, can be saved as described above in relation to the save search module 140. This saved search essentially defines a particular node within the research system structure. Once the search procedure has been saved, the user can request to be updated automatically with new information from the particular node of which the saved search defines. At each node, specific articles of information reside. As part of the node, parameters are used to define each individual article of information. As each new article of information is added to a particular node, the parameters associated with that particular node are set to values that define the new article of information to be added. The parameters are set by the user entering the new information into the system. The new information, along with its corresponding parameters, will need to be approved by a node owner before the new information is actually added to the system. This approval method will be discussed in greater detail below. It is the setting of the parameters that enables new information to be "pushed" to other users who have previously saved a search in order to be automatically updated when desired new information is entered into the system. In other words, the push functionality is performed in response to a saved search established by a specific user. When new or updated information is added to the node and this information matches the saved query selected by the user, the research system will notify the user of the added information. After a notification has been pushed to the appropriate user, this user accepts the push and establishes a method of receipt. The method of receipt includes, but is not limited to, email, news groups, bulletin boards, or desktop. It should be clear that other alternative methods to push information to users are also available.

In conventional systems, push technology is not used within directories or search engines. The research system of the present invention makes it possible to apply push technology to directories and search engines due to the way that the search has been defined (by its navigation path and by its parameters) and the structure of the tree.

When a new item is entered into the system, the description of this item is propagated up the nodes of the tree so that no matter what level of saved search the user has run, the user will know of any relevant new items entered into the system.

For example, certain Mercedes dealerships would like to receive all factory announcements related to a particular model. Therefore, the notification module 150 is utilized to push all announcements regarding the particular model that are added to the database 120. The notification module 150 also can be used to push data to research sites or to stockbrokers looking to stay abreast of a particular industry or technology.

The query language module 160 uses a specific query language to navigate through the directory and decision tree to access a specific node or a discrete data item within the directory. Each node within the decision tree has a corresponding query that can be used to quickly arrive at the node without manually navigating through the branches of the decision tree. The query can be further extended to access a discrete data item corresponding to the specific node. A user has the ability to save a query for a particular node or discrete data item to later access information at the node without manually navigating through the branches of the decision tree to arrive at the node.

The structure of the query language of the present invention is preferably similar to that of a specific query language (SQL), but it is specific to the combined technologies of accessing the directory tree structure and setting parameters for a search. Therefore, the application of the query language is different than conventional search methodologies due to the unique directory tree structure of the database management and research system of the present invention.

In the present invention, all nodes are specific. This is not typical of nodes in conventional directories. As an example, an "entertainment" node may be listed in multiple branches of conventional directories, but within the research system of the present invention the node is specific to a single branch. This specificity allows a query to be performed that will find exactly what is being searched for. If the node were listed in multiple branches, the same query would result in multiple search results, which is not desired.

As an alternative to manually navigating the directory tree structure using the aforementioned search methodologies, the user has the option to input a query language string to define the research task desired of the research system. Inputting the query string yields equivalent results as does manually going through the directories, the trees, and the parametric searches, as discussed above. Direct user input of the desired query string essentially shortcuts the search process. As is the case with the research tasks described above, the query string can be saved as a save search. Whether a save search is a result of manually navigating the directory tree structure or directly inputting a desired query string, the research system saves the search in the query language format.

The research system has the ability to interface with external applications through the external systems module 170. Interfacing is accomplished utilizing the SQL-like query language as discussed above in relationship to the query language module 160, an application program interface (API), and a directory to directory protocol. The query language is a third generation language to do simple queries to the research system. An example query looks like:

IQUERY<instance node>/<instance name>LIST*FROM <node key>
  WHERE commercial=Y
  AND LINK DESC CONTAINS "Chevrolet";

The options for this query language contain READ functions and UPDATE functions.

The API within the external systems module 170 allows other applications, either external systems or web sites, to use the research system as a central infrastructure knowledge base. The API system creates an interface between the application and the research system that allows a seamless connection to be made without users of the application noticing. The application can call upon resources contained inside the research system on the same server or across an IP connection on similar networks or across the Internet. The external systems use the API to periodically or randomly query the research system for information, the queries are formatted in the query language as described in the query language module 160. The application can make a request to the research system for specific data from one or more nodes within the directory tree structure, the research system retrieves the requested data, the application pulls the retrieved data from the research system, the application reformats the retrieved data for the system on which the application resides, and the system utilizes the retrieved data as if the system itself retrieved and formatted the data.

The database management and research system of the present invention is designed so a separate portal can be set up within the research system that allows external search engines to search the research system directory tree structure and expose information to the search engine customers. As an example, an external system is a job search site and the research system includes a multitude of job listings organized within a job directory tree structure. A user on the job search site submits a request to find all the jobs within California, related to information technology (IT) with TCP/IP and SNA skills. The job search site system formats a query using the API of the research system and forwards the request to the research system, the research system retrieves the matching jobs, and the data is sent back to the job search site system where it is formatted according to the job search site parameters. This entire process is accomplished transparently to the job search site user. In this example, the research system provides the back end functionality and the data is fed back to the job search site program running the API. It is transparent to the research system that the query originated from an external system.

The directory to directory protocol allows referrals from one research system to be processed from another research system. This allows the research system to scale to larger proportions across multiple organizations and data centers. One organization can maintain data specific to its own expertise or ownership inside it's own hosted research system.

Figure 9:
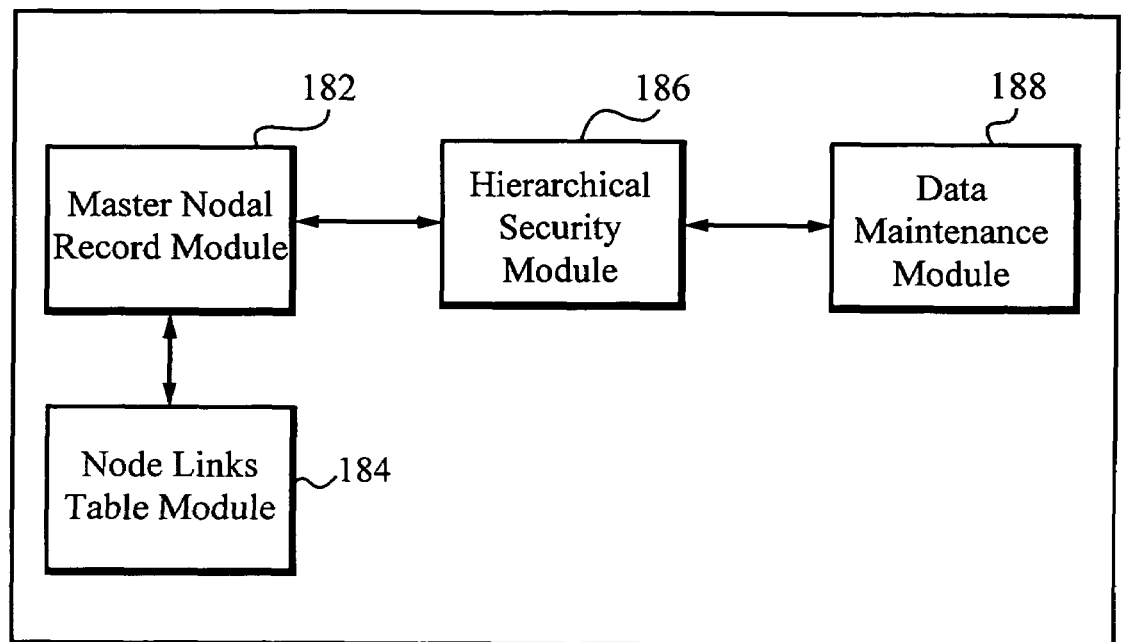
FIG. 9 illustrates a block diagram of the maintenance module of the present invention.

The maintenance module 180 manages the process of inputting and deleting data into the searchable database 120. The maintenance module 180 also manages relationships between data residing within the searchable database 120. A block diagram of the maintenance module 180 according to the preferred embodiment of the present invention is illustrated in FIG. 9. The maintenance module 180 includes a master nodal record module 182, a node links table module 184, an hierarchical security module 186, and a data maintenance module 188. The hierarchical security module 186 is coupled to the master nodal records module 182 and the data maintenance module 188 to maintain the integrity of the data associated with each node. The node links table module 184 is coupled to the master nodal records module 182 to manage the linking relationships between the nodes in the research system.

The master nodal record module 182 maintains a record of the data and links related to each individual node. As discussed above, each node has an associated encyclopedia page as described in relation to the encyclopedia module 130. Links at the node are attached to records in the searchable database 120 or to the encyclopedia. If the link is to a discrete data item, then the link is attached to the record in the searchable database. If the link is to another node, then the link is attached to the encyclopedia and the associated encyclopedia page.

Each node in the directory tree structure includes data specific to that location of the tree. The data available preferably includes node-name and node-description. The node-description is a detailed description of the tree node that explains to the user what the category is. Each node also includes related topics and search parameters. These topics define a search, they are not just links.

The node links table module 184 maintains a node links table of links between all nodes within the directory tree structure. The links between nodes are referred to as cross-links. At each level of the directory there is the possibility of one to many links (objects) available. A table linked in a "one to many" relationship is the "links table". This table is where the object data is located that the user is interested in locating. The table includes the fields link-node-name, link-description, and link-path. An example of the node links table usage is herein described to navigate down the directory tree structure to "plants". The node links table may include lists to academic web sites on botany. Clicking on one of these entries will navigate the user to the external web sites to further research botany. To continue the example, the user could continue down the directory tree structure. The lower down the structure the user travels, the more specific and less general the categories become, and the more specific the links would be. If the user continued down the directory tree structure past "plants" to "juniper trees", the links would be web or database objects such as web sites, photos, movie files, etc., only pertaining to juniper trees.

Cross-links to related topics are also available. Objects are linked to multiple categories inside the directory tree structure, so users can also navigate laterally around the directory tree structure.

Many objects inside the directory tree structure belong correctly into more than one category. An example of this is the "pepper plant". The "pepper plant" is correctly classified as a plant, a spice, a fruit, an edible plant, etc. This object is entered into the system into one nodal master record, as described above in relation to the master nodal record module 182, then entered into the directory at multiple locations within the tree. When navigating down through the edible plants, a user will find the key for the "pepper plant." A user will also find the key for the "pepper plant" when navigating down the spice section of the directory tree structure.

When a nodal master record is located in more than one location in the directory tree structure, a cross-reference table record is added to the node links table. When the object is located, the user has the option of listing all other nodes (or categories) in which the object is also contained.

This is an "Also Related Categories" function of the system. When this function is accessed, typically by clicking on a related button on the display, for the example of "pepper plant", the other categories are listed (plants, edible plants, spices, etc.). This gives the user the ability to navigate laterally within the directory structure. The user can find the "pepper plant" node, click on the "Also Related Categories" button, then select any of the other categories where the "pepper plant" is located and move to that location in the directory by selecting that category.

Using cross-links there are multiple paths to the same data. Many conventional search engines will list each path as a separate search result, which leads to cumbersome and repetitive results list. However, using the database management and research system of the present invention, a search result will preferably be listed only once so that a user does not have to wade through multiple search results which all lead back to the same data.

Additional data is stored about each link in the node links table. The additional data includes such data as family rating, link rating, type, entertainment, and link hits. The family rating is a rating similar to movie ratings, i.e. "G" is okay for the family, "R" maybe a little rough or risque, and "X" is pornography and inappropriate for certain family members. The link rating is maintained by user surveys and maintains a rating or popularity value for the link. The type is a link entry corresponding to categories such as Commercial, Private, or Educational. Entertainment can include games, activities, art, etc. Link hits represent a value maintained by the system and records the number of times users entered this site from the directory tree. The links hit value is used for recording how active and useful a link is.

An additional table linked in a "one to many" relationship is the node keyword table. The node keyword table is maintained by the node links table module 184 and includes keywords associated with a particular node in the directory tree structure. The use of this table is to help the system navigate the user directly to the node location. This gives the user the capability of navigating directly to this location in the tree with a simple keyword navigation, or with a directory front-end structure or interface.

As an example, the user can enter "car" and navigate directly to the "automobiles" section in the directory tree structure. The user can then navigate the directory tree structure to the specific object that they are looking for, or enter another more specific keyword. A benefit of the database management and research system of the present invention is when the more specific keyword is entered while the user is at the "automobile" node, the resulting search results will reflect matches found in the "automobile" node and the lower directory structure tied to the "automobile" node.

The hierarchical security module 186 allows users to maintain their own data, or their own particular nodes of the tree. An expert within a particular field can "own" this node of the tree. This allows for the system to be maintained by any number of editors and contributors with expertise or interest in their particular node(s). The system is structurally designed to be able to split the tree into administrative and logical partitions. If necessary, these partitions can span multiple computer nodes and multiple data centers over geographical regions.

Ownership of portions of the directory tree structure can be delegated to external authors or organizations. Organizations with ownership of portions of the directory tree structure can further delegate portions of their ownership to different authors inside their organization.

If a user wants to add a new item, the user must first be logged into the system. Certain users can be listed as "OK" and if these users add a new item, the item will automatically be entered into the system without need for additional approval. Of course, the user must still provide the details regarding the new item's classification, corresponding parameters, etc. However, the item itself does not need to be approved. If a user is not approved or is "unknown", then the new item will be put in a queue for review by the owner of the particular node to which the user wants to add the item. The owner of the node will then determine whether or not to add the new item to the system. Typically, if the database is the Internet or an Internet accessible database, then each new item has an associated uniform resource locator (URL). The URL is considered new data and in essence acts as a directory. Certain items will not have a URL, such as an announcement. For example, an announcement might be used by a user who wants to enter an item regarding a new book they wrote; however, if the user does not have a web site associated with the new book, the user fills out the information associated with the new item, which includes some descriptive text and search parameters. Only this information associated with the new item is then stored at the appropriate node.

Each node of the directory tree structure preferably includes a link to a user table. The user table includes a list of users authorized for update access to the node. The users with update access to the node have update access to the nodes below the specific node as well. The user with full authorization can also delegate update authority to users at or below the directory tree structure where they have ownership rights.

There are many examples where such update or ownership authorization is beneficial. For example, companies that produce products listed at the particular level of the directory and below. Educational organizations might take ownership of specific technologies, such as botany for plants, where the organization could research all botany-related objects and maintain these links on a volunteer basis. Individual experts in a field or volunteers might maintain areas of the directory tree structure. In corporate Intranets, specific departments maintain their own objects on the directory tree structure.

The hierarchical security module 186 enables node owners to control the addition and deletion of data into the searchable database 120. However, the nodes and associated content also need to be maintained, which is a function of the data maintenance module 188.

Volunteers and special interest groups act to maintain the nodes and associated content. Maintenance preferably includes the need to rate content, match parameters, scan new items to eliminate spam, hate mail, etc., and scrub links to maintain the reliability of links. In corporate Intranets, individual authors or departments can maintain this structure and object links. If the reliability of a link is below a threshold value the link can be eliminated. Such a reliability check is an example of business policies that can be set.

The data in the directory is manually entered and maintained. For content on commercial web sites, users submit data into a holding queue to be reviewed before being released and added to the research system. The data maintenance module 188 performs up-front edits to insure data completeness and integrity.

One method by which new data is added is for the user to navigate the directory tree structure to the correct location. At the correct location, the user selects an "add link" option. A set of forms is presented to the user who will then fill in the data fields. For each new data item to be added, the user will also set the parameters corresponding to the location within the directory tree structure to which the new data item is to be added. These parameters are of the type described above in relation to the parametric search. After the up-front edits, the data is added or moved to the update queue, where the data is reviewed and released (or discarded). The user can navigate the directory tree structure again to add the same link to other locations within the directory. This is done by selecting the "add again to another category" option, then navigating to the new location and selecting "add link" option as before. The system will "remember" the link record and add the link to the current node record as well. It should be clear to those skilled in the art that other methods of data entry are also available to be used to submit new information into the research system.

Once a user has accessed the research system, the user has the ability to perform a research task and find desired information that resides in the searchable database 120. The data in the searchable database 120 is organized into a directory tree structure by the research system. At each branch in the tree is a node which includes related information. The higher the node is within the directory tree structure the more general the information, and the lower the node is within the directory tree structure the more specific the information. At each node within the tree, the user is presented with the option of using any one or combinations of the four search methodologies utilized by the research system. The four search methodologies are keyword search, hierarchical tree search, dichotomous key search, and parametric search. Regardless as to which search methodology or search methodologies are used to reach a particular node, the user can utilize any of the four search methodologies to further refine the search and move further down the directory tree structure. The user may also navigate back up the directory tree structure to a higher node, and once again have the option to use any one of the four search methodologies to refine the search from the current node and move further down the directory tree structure. The related information at each node is presented in the form of an encyclopedia page. Each node is linked to an encyclopedia page, where the encyclopedia page displays the related information associated with that particular node. Such related information can include a title, short description, text, graphics, and links to related topics. The links are typically to other nodes within the research system. However, the links may be to web sites external to the research system. In this manner, a user can navigate the directory tree structure, utilizing any one of the four search methodologies in any combination to reach the desired result.

The following is an example of how all four search methodologies can be utilized to successfully complete a research task. After accessing the database management and research system, a user inputs the character string "transportation" utilizing the keyword search option. The keyword search module then yields a list of search results including the node "transportation". The user performs a hierarchical tree search on "transportation" which results in a list including "airplane", "automobile", "boat", "train", etc. The user can then further investigate "automobile" by performing a dichotomous key search. The dichotomous key search on "automobile" yields the two choices "foreign" and "domestic". The user chooses "foreign" and the next dichotomous key search yields the two choices "specific car manufacturer" and "not a specific manufacturer". The user then performs a hierarchical search on "specific car manufacturer" that results in a list of foreign car manufactures which includes BMW, Mercedes-Benz, Volvo, etc. The user performs a dichotomous key search on "Mercedes-Benz" that yields the two choices "Mercedes-Benz Dealers" and "Mercedes-Benz Models". The user chooses "Mercedes-Benz Dealers" and the next dichotomous key search yields the two choices "North American Dealerships" and "European Dealerships". The user chooses "North American Dealerships" and the next dichotomous key search yields the two choices "west" and "east". The user then performs a parametric search on "west" by inputting the relevant parameters to "object type", "language", and "family rating". The parameters are selected from provided drop down menus. Additional means for selecting parameters include listing items to be checked or not checked. Such parameters to be checked include "technical document", "commercial", "recalls", "exclusive", "OEM", and "full service". Upon selecting the desired parameters, the parametric search yields a discrete list of dealerships that match the selected parameters. By selecting a particular dealership from the list of dealerships, an encyclopedia page is displayed by the encyclopedia module. The displayed encyclopedia page corresponds to the selected dealership.

As discussed above, the research system provides search techniques and methodologies that enable users to navigate down a directory tree structure for the purpose of performing a research task and finding discrete information. The directory tree structure is organized such that the upper levels include relatively more general information and the lower levels include relatively more specific information. The research system also provides functionality that enables the user to move back up the directory tree structure, preferably moving back up the directory one level at a time. In this way, the user is able to navigate up and down the directory tree structure to perform the desired research task.

As discussed above, the database management and research system of the present invention utilizes a directory tree structure to manage and access data within a searchable database. The directory tree structure is preferably customizable and is constructed using easy to use templates. An appropriately authorized user populates the templates to generate the nodes and the branches between the nodes. In the preferred embodiment, the nodes represent html addresses and the branches represent links from an html address of one node to an html address of another node. The html based format facilitates user access of the system over the Internet or corporate intranet. As described above, the nodes include related data where data preferably refers to web-based multimedia including sound, images, video, and appropriately formatted text. Appropriately formatted text can include, but is not limited to, word documents, excel documents, powerpoint documents, mechanical drawings, and any document or file rendered by a personal computer or a workstation. It should be clear to one skilled in the art that data can also include discrete appropriately formatted and independently accessible data items, files, and applications with associated URLs and web interface stored in human resource databases, financial and accounting databases, manufacturing databases, order processing and fulfillment databases, customer service databases, sales and marketing databases, and other similar databases or data file formats. The related data is not physically formatted within the directory tree structure. Instead, each data item is accessible through appropriately formatted addresses including Uniform Resource Identifiers (URIs) and Uniform Resource Locators (URLs). Each node includes associated pointers, where each pointer acts as a link, or points, from a specific node to a URL corresponding to a discrete data item within the searchable database. In this manner, the directory tree structure accesses the discrete data item by utilizing the pointer that links the specific node to the URL corresponding to the discrete data item. Defining the pointers is part of the directory tree structure construction process performed by the user. Through such a construct, the directory tree structure essentially overlays the searchable database and groups related data items via the pointers. Each discrete node is a collection of pointers to the related data items. This overlay methodology for accessing data is what enables the database management and research system of the present invention to bypass the data conversion process when utilizing the database management and research system with an appropriately formatted existing database.

When constructing the directory tree structure, the user is able to create as many nodes and branches as necessary. Once constructed, the nodes and branches can be edited or deleted by the corresponding node owners. Editing of a node includes adding a new pointer to a node or redirecting an existing pointer from accessing one data item to accessing a different data item.

Figure 10A:
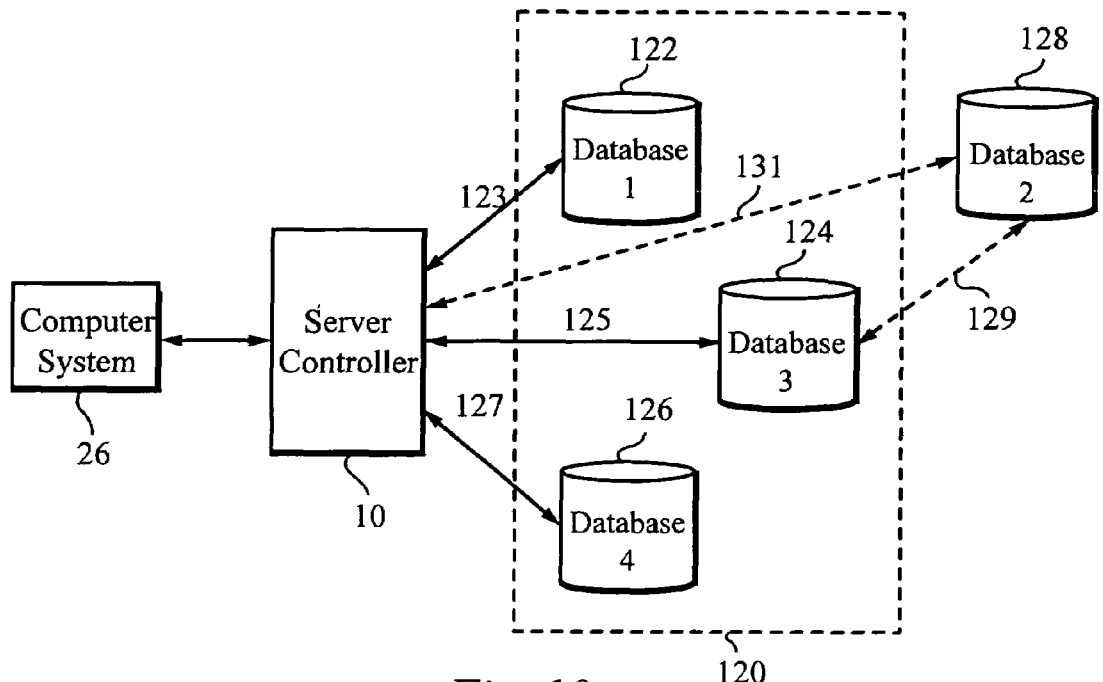
FIG. 10a illustrates the database management and research system accessing the searchable database.

FIG. 10a illustrates an example of how the database management and research system of the present invention is utilized with an existing database. The computer system 26 and the server controller 10 correspond to the like elements of FIG. 1. As in FIG. 1, the computer system 26 is coupled to the server controller 10 preferably via the public switched telephone network. The searchable database 120 corresponds to the searchable database 120 in FIG. 7. In FIG. 10a, the searchable database 120 includes database 122, database 124, and database 126. Although the searchable database 120 in FIG. 10a includes three databases, it should be clear that the searchable database 120 can include any number of databases. Server controller 10 is coupled to database 122 via a link 123. In general, the link 123 represents a link between the controller 10 and the database 122. In particular, the link 123 represents a pointer corresponding to a specific node within the directory tree structure of the present invention, where the pointer directs the specific node to a discrete data item residing within the database 122. As such, the link 123 can include any number of pointers where each pointer directs a specific node within the directory tree structure to a discrete data item within the database 122. Similarly, server controller 10 is coupled to the database 124 and the database 126 via a link 125 and a link 127, respectively. As with the link 123, the links 125 and 127 can include any number of pointers, where a pointer represented by the link 125 directs a specific node to a discrete data item residing within the database 124 and a pointer represented by the link 127 directs a specific node to a discrete data item residing within the database 126. A database 128 is coupled to the server controller 10 via a link 131. The database 128 is external to the searchable database 120. As such, the directory tree structure does not directly overlay the database 128 and therefore no pointers exist to direct a specific node to a discrete data item residing within the database 128. Although the database 128 is illustrated as a single database, it should be clear that the database 128 serves to represent any data not included within the searchable database 120.

As described above, the database management and research system of the present invention provides links to data residing external to the searchable database 120. Such a link is illustrated by the link 131 and also by a link 129. The link 129 couples the database 124 to the database 128. A discrete data item within the database 128 is accessed by the server controller 10 via the link 131. A specific node within the directory tree structure does not include a pointer which directs the particular node to a discrete data item residing within the database 128; instead, the specific node is linked via conventional means, as for example a hypertext link that takes a user outside the system of the present invention by linking to a web server containing the discrete data item. Alternatively, the specific node includes a pointer corresponding to the link 125 that directs the specific node to a discrete data item residing within the database 124. In turn, the discrete data item residing within the database 124 includes a conventional link 129 directed to the discrete data item residing within the database 128, the link 129 takes the user outside the system of the present invention.

Figure 10B:
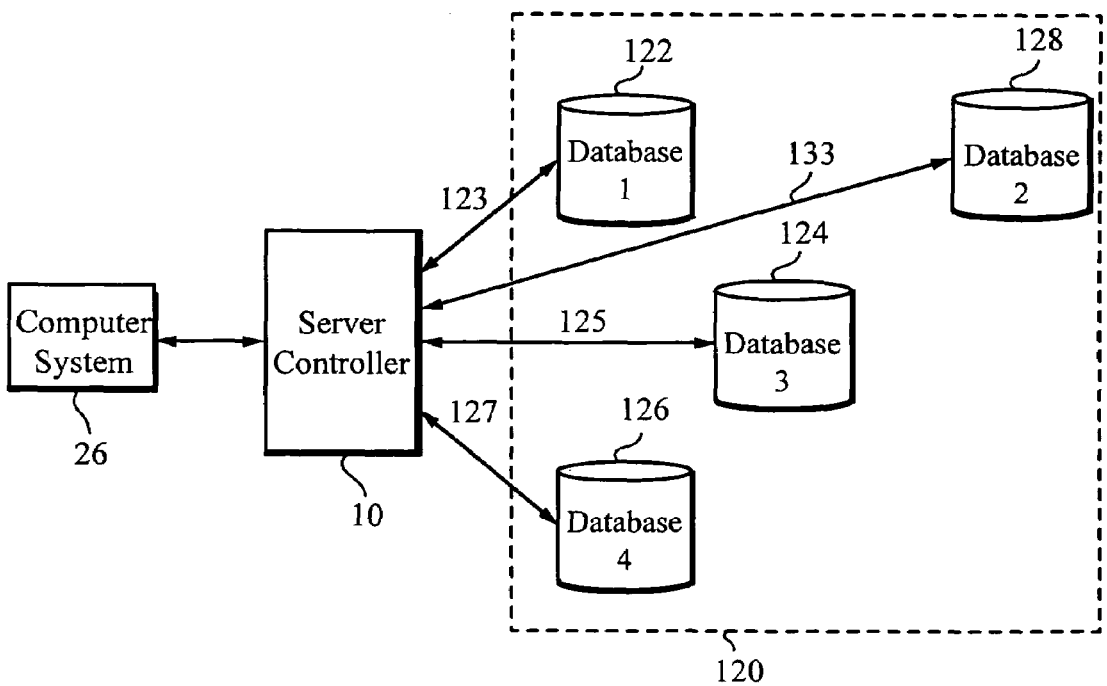
FIG. 10b illustrates the accessing scheme of FIG. 10a after modifications to the directory tree structure.

Nodes and branches can be added, edited, or deleted within the directory tree structure of the present invention. Such modifications are made to the directory tree structure using the templates of the database management and research system. FIG. 10b illustrates the database management and research system of FIG. 10a after modifications to the directory tree structure have been made. FIG. 10a illustrates the link 131 representative of a hypertext link between a specific node within the directory tree structure and a discrete data item residing within the database 128, the database 128 residing external to the system of the present invention. In FIG. 10b, the database 128 is coupled to the server controller 10 via a link 133. By using the templates to edit the specific node, a pointer is added to the specific node that now directs the specific node to the discrete data item residing within the database 128, thereby eliminating the need to link the specific node to the discrete data item via the conventional link 131. By replacing the conventional link 131 with the pointer represented by the link 133, the user is no longer taken outside the system of the present invention to view the discrete data item. By staying within the system of the present invention, all or a portion of the discrete data item can be displayed within an encyclopedia page corresponding to the specific node. If the user chooses to view the complete original discrete data item, the user will then be taken out of the system via the link 133 to the database 128. The added pointer is part of the directory tree structure and as such the directory tree structure now overlays the discrete data item represented by the database 128. Since data within the database 128 is now accessible by the overlaid directory tree structure, the database 128 is included within searchable database 120, as illustrated in FIG. 10*b*.

The research system described above has been discussed in terms of a single directory tree structure; however, it should be apparent that the research system of the present invention can be scaled to include multiple directory tree structures maintained at remote network locations. Such scalability allows other organizations to maintain portions of the directory tree structure distinctly but allows the directory tree structure network to function as one logical system or searchable database. By segmenting sections of the directory tree structure into different data centers, the research system essentially becomes a knowledge system where a user can find specific and related information. For example, a user can use the research system to diagnose a medical condition and find relevant information related to that medical condition. The user can also find related sites like clinics and medicines available to treat the medical condition.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is accessible over the internet through the public switched telephone network, the present invention could also be accessible on any other appropriate communication structures both wired and wireless, including cable, intranets, direct connections and the like.

I claim:

1. A method of accessing information within a directory tree structure comprising the steps of:
   a. formatting a searchable database into the directory tree structure, wherein the directory tree structure includes nodes comprising a collection of related data and branches comprising links between the nodes, further wherein each specific node provides a corresponding set of parameters by which each related item of data corresponding to the specific node is defined by setting each parameter with a corresponding value associated with the data item, thereby forming a set parameter;
   b. accessing a particular node within the directory tree structure utilizing a research module including keyword search, hierarchical search, and dichotomous key search, wherein when accessing each of the nodes within the directory tree structure utilizing the research module, each of the keyword search, hierarchical search, and dichotomous key search, are available at any location, including at any displayed page, within the searchable database, wherein the keyword search, the hierarchical search and the dichotomous key search are available at any displayed page within the searchable database without requiring user input;
   c. setting one or more search parameters corresponding to the set of parameters of the particular node; and
   d. performing a parametric search from any node within the directory tree structure using the one or more set search parameters corresponding to the particular node to match the one or more search parameters to the set parameters for each item of data corresponding to the particular node, thereby generating one or more matching discrete data items.

2. The method as claimed in claim 1 wherein the parameters are customizable and specific to the particular node.

3. The method as claimed in claim 1 wherein when the keyword search is utilized, the search criteria is one or more keywords input by a user.

4. The method as claimed in claim 1 wherein when the hierarchical search is utilized, the search criteria is a selected one of a list of one or more directory items.

5. The method as claimed in claim 1 wherein when the dichotomous key search is utilized, the search criteria is a selected one of two binary items.

6. The method as claimed in claim 1 wherein the searchable database is distributed into more than one physical location.

7. The method as claimed in claim 1 wherein the steps of accessing a particular node, setting the search parameters, performing a parametric search are performed by a server.

8. The method as claimed in claim 7 further comprising the step of establishing an internet connection with the server to perform one or more searches and utilize the parametric search.

9. The method as claimed in claim 1 further comprising the step of maintaining the node by appropriately adding and deleting data to and from the node.

10. The method as claimed in claim 9 wherein the step of maintaining the node is performed by a node owner who maintains the corresponding node and all nodes that are linked beneath the corresponding node within the directory tree structure.

11. A research system for accessing information within a directory tree structure comprising:
   a. means for formatting a searchable database into the directory tree structure, wherein the directory tree structure includes nodes comprising a collection of related data and branches comprising links between the nodes, further wherein each specific node provides a corresponding set of parameters by which each related item of data corresponding to the specific node is defined by setting each parameter with a corresponding value associated with the data item, thereby forming a set parameter;
   b. means for accessing a particular node within the directory tree structure utilizing a research module including keyword search, hierarchical search, and dichotomous key search, wherein when accessing each of the nodes within the directory tree structure utilizing the research module, each of the keyword search, hierarchical search, and dichotomous key search, are available at any location, including at any displayed page, within the searchable database, wherein the keyword search, the hierarchical search and the dichotomous key search are available at any displayed page within the searchable database without requiring user input;
   c. means for setting one or more search parameters corresponding to the set of parameters of the particular node; and
   d. means for performing a parametric search from any node within the directory tree structure using the one or more set search parameters corresponding to the particular node to match the one or more search parameters to the set parameters for each item of data corresponding to the particular node, thereby generating one or more matching discrete data items.

12. The research system as claimed in claim 11 wherein the parameters are customizable and specific to the particular node.

13. The research system as claimed in claim 11 wherein when the keyword search is utilized, the search criteria is one or more keywords input by a user.

14. The research system as claimed in claim 11 wherein when the hierarchical search is utilized, the search criteria is a selected one of a list of one or more directory items.

15. The research system as claimed in claim 11 wherein when the dichotomous key search is utilized, the search criteria is a selected one of two binary items.

16. The research system as claimed in claim 11 wherein the searchable database is distributed into more than one physical location.

17. The research system as claimed in claim 11 wherein the means for accessing a particular node, setting the search parameters, and performing a parametric search are performed by a server.

18. The research system as claimed in claim 17 further comprising means for establishing an internet connection with the server to perform one or more searches and utilize the parametric search.

19. The research system as claimed in claim 11 further comprising means for maintaining the node by appropriately adding and deleting data to and from the node.

20. The research system as claimed in claim 19 wherein the means for maintaining the node is performed by a node owner who maintains the corresponding node and all nodes that are linked beneath the corresponding node within the directory tree structure.

21. A research system for accessing information within a directory tree structure comprising a research server configured to format a searchable database into the directory tree structure, wherein the directory tree structure includes nodes comprising a collection of related data and branches comprising links between the nodes, further wherein each specific node provides a corresponding set of parameters by which each related item of data corresponding to the specific node is defined by setting each parameter with a corresponding value associated with the data item, thereby forming a set parameter, to access a particular node within the directory tree structure utilizing a research module including keyword search, hierarchical search, and dichotomous key search, wherein when accessing each of the nodes within the directory tree structure utilizing the research module, each of the keyword search, hierarchical search, and dichotomous key search, are available at any location, including at any displayed page, within the searchable database, wherein the keyword search, the hierarchical search and the dichotomous key search are available at any displayed page within the searchable database without requiring user input, to set one or more search parameters corresponding to the set of parameters of the particular node, and to perform a parametric search from any node within the directory tree structure using the one or more set search parameters corresponding to the particular node to match the one or more search parameters to the set parameters for each item of data corresponding to the particular node, thereby generating one or more matching discrete data items.

22. The research system as claimed in claim 21 wherein the parameters are customizable and specific to the particular node.

23. The research system as claimed in claim 21 wherein when the keyword search is utilized, the search criteria is one or more keywords input by a user.

24. The research system as claimed in claim 21 wherein when the hierarchical search is utilized, the search criteria is a selected one of a list of one or more directory items.

25. The research system as claimed in claim 21 wherein when the dichotomous key search is utilized, the search criteria is a selected one of two binary items.

26. The research system as claimed in claim 21 wherein the searchable database is distributed into more than one physical location.

27. The research system as claimed in claim 21 further comprising an interface circuit coupled to the research server to establish a connection with a computer system.

28. The research system as claimed in claim 27 wherein the connection is established with the computer system at a remote location from the interface circuit.

29. The research system as claimed in claim 28 wherein the connection is established with the remote computer system and the interface circuit over the internet to allow users to access the research system, to access the particular node, to set the search parameters, and to perform the parametric search.

30. The research system as claimed in claim 21 further comprising a node owner for maintaining the node by appropriately adding and deleting related data to and from the node.

31. The research system as claimed in claim 30 wherein the node owner maintains the corresponding node and all nodes that are linked beneath the corresponding node within the directory tree structure.

32. A network of devices for accessing information within a directory tree structure comprising:
   a. one or more computer systems configured to establish a connection with other systems; and
   b. a research server coupled to the one or more computer systems to format a searchable database into the directory tree structure, wherein the directory tree structure includes nodes comprising a collection of related data and branches comprising links between the nodes, further wherein each specific node provides a corresponding set of parameters by which each related item of data corresponding to the specific node is defined by setting each parameter with a corresponding value associated with the data item, thereby forming a set parameter, to access a particular node within the directory tree structure utilizing a research module including keyword search, hierarchical search, and dichotomous key search, wherein when accessing each of the nodes within the directory tree structure utilizing the research module, each of the keyword search, hierarchical search, and dichotomous key search, are available at any location, including at any displayed page, within the searchable database, wherein the keyword search, the hierarchical search and the dichotomous key search are available at any displayed page within the searchable database without requiring user input, to set one or more search parameters corresponding to the set of parameters of the particular node, and to perform a parametric search from any node within the directory tree structure using the one or more set search parameters corresponding to the particular node to match the one or more search parameters to the set parameters for each item of data corresponding to the particular node, thereby generating one or more matching discrete data items.

33. The network of devices as claimed in claim 32 wherein the parameters are customizable and specific to the particular node.

34. The network of devices as claimed in claim 33 wherein when the keyword search is utilized, the search criteria is one or more keywords input by a user.

35. The network of devices as claimed in claim 33 wherein when the hierarchical search is utilized, the search criteria is a selected one of a list of one or more directory items.

36. The network of devices as claimed in claim 33 wherein when the dichotomous key search is utilized, the search criteria is a selected one of two binary items.

37. The network of devices as claimed in claim 32 wherein the searchable database is distributed into more than one physical location.

38. The network of devices as claimed in claim 32 wherein the one or more computer systems and the research server are coupled together over the internet to allow users to access the research system, to access the particular node, to set the search parameters, and to perform the parametric search.

39. The network of devices as claimed in claim 32 further comprising a node owner for maintaining the node by appropriately adding and deleting related data to and from the node.

40. The network of devices as claimed in claim 39 wherein the node owner maintains the corresponding node and all nodes that are linked beneath the corresponding node within the directory tree structure.

41. A method of accessing information within a directory tree structure comprising the steps of:
 a. formatting a searchable database into the directory tree structure, wherein the directory tree structure includes nodes comprising a collection of related data and branches comprising links between the nodes, further wherein each specific node provides a corresponding set of parameters by which each related item of data corresponding to the specific node is defined by setting each parameter with a corresponding value associated with the data item, thereby forming a set parameter;
 b. accessing a particular node within the directory tree structure utilizing a research module, the research module includes a keyword search, a hierarchical search, a dichotomous key search, and a parametric search, wherein each utilization of the research module includes availability of the keyword search, the hierarchical search, the dichotomous key search, and the parametric search at any location, including at any displayed page, within the searchable database, wherein the keyword search, the hierarchical search, the dichotomous key search, and the parametric search are available at any displayed page within the searchable database without requiring user input;
 c. setting one or more search parameters corresponding to the set of parameters of the particular node; and
 d. performing a parametric search from any node within the directory tree structure using the one or more set search parameters corresponding to the particular node to match the one or more search parameters to the set parameters for each item of data corresponding to the particular node, thereby generating one or more matching discrete data items.

\* \* \* \* \*